US011140696B2

United States Patent
Lee et al.

(10) Patent No.: US 11,140,696 B2
(45) Date of Patent: *Oct. 5, 2021

(54) METHOD FOR TRANSMITTING A SIGNAL OF A USER EQUIPMENT FOR V2X COMMUNICATION IN A WIRELESS COMMUNICATION SYSTEM AND APPARATUS USING THE SAME

(71) Applicant: LG ELECTRONICS INC., Seoul (KR)

(72) Inventors: Jongyoul Lee, Seoul (KR); Hanbyul Seo, Seoul (KR); Youngtae Kim, Seoul (KR); Seungmin Lee, Seoul (KR); Hyukjin Chae, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 16/064,894

(22) PCT Filed: Mar. 30, 2018

(86) PCT No.: PCT/KR2018/003790
§ 371 (c)(1),
(2) Date: Jun. 21, 2018

(87) PCT Pub. No.: WO2018/182365
PCT Pub. Date: Oct. 4, 2018

(65) Prior Publication Data
US 2021/0051627 A1 Feb. 18, 2021

Related U.S. Application Data

(60) Provisional application No. 62/479,386, filed on Mar. 31, 2017, provisional application No. 62/489,999, (Continued)

(51) Int. Cl.
*H04W 72/12* (2009.01)
*H04W 72/02* (2009.01)
(Continued)

(52) U.S. Cl.
CPC ....... *H04W 72/1263* (2013.01); *H04L 1/0003* (2013.01); *H04L 1/0068* (2013.01); (Continued)

(58) Field of Classification Search
CPC ......... H04W 4/40; H04W 40/02; H04W 4/46; H04W 72/1278; H04W 72/14; H04W 72/04

See application file for complete search history.

(56) References Cited

U.S. PATENT DOCUMENTS 10,594,455 B2 * 3/2020 Kim ......................... H04W 4/44
10,742,380 B2 * 8/2020 Lee ........................ H04L 5/0053
(Continued)

FOREIGN PATENT DOCUMENTS

WO    WO2016093573 A1    6/2016
WO    WO2017034358 A1    3/2017

OTHER PUBLICATIONS

U.S. Office Action in U.S. Appl. No. 16/536,986, dated Sep. 18, 2020, 15 pages.
(Continued)

*Primary Examiner* — Raj Jain
(74) *Attorney, Agent, or Firm* — Fish & Richardson P.C.

(57) ABSTRACT

Provided is a method for transmitting a signal by a terminal for vehicle-to-everything (V2X) communication in a wireless communication system and a terminal using the same method. The method comprises: mapping V2X data to a resource of a subframe including multiple symbols in a time domain; and transmitting the mapped V2X data to another terminal, wherein, in the step of mapping, resource elements included in a last symbol of the subframe are excluded.

9 Claims, 20 Drawing Sheets

Related U.S. Application Data filed on Apr. 25, 2017, provisional application No. 62/501,764, filed on May 5, 2017, provisional application No. 62/505,981, filed on May 14, 2017, provisional application No. 62/544,008, filed on Aug. 11, 2017, provisional application No. 62/546,570, filed on Aug. 17, 2017, provisional application No. 62/565,120, filed on Sep. 29, 2017.

(51) Int. Cl.
| | | |
|---|---|---|
| *H04W 72/04* | (2009.01) | |
| *H04W 72/14* | (2009.01) | |
| *H04W 4/40* | (2018.01) | |
| *H04L 1/00* | (2006.01) | |
| *H04W 92/18* | (2009.01) | |

(52) U.S. Cl.
CPC ............ *H04W 4/40* (2018.02); *H04W 72/02* (2013.01); *H04W 72/0406* (2013.01); *H04W 72/0446* (2013.01); *H04W 72/1278* (2013.01); *H04W 72/14* (2013.01); *H04W 92/18* (2013.01)

(56) References Cited

U.S. PATENT DOCUMENTS

| | | | |
|---|---|---|---|
| 2016/0353478 A1* | 12/2016 | Kim | .................. H04W 72/12 |
| 2017/0048036 A1 | 2/2017 | Tavildar | |
| 2018/0049220 A1 | 2/2018 | Patil et al. | |
| 2018/0192397 A1* | 7/2018 | Seo | ........................ H04W 72/02 |
| 2018/0317066 A1* | 11/2018 | Xu | ........................... H04W 4/46 |
| 2018/0338319 A1* | 11/2018 | Kim | .................... H04W 72/044 |
| 2018/0376525 A1* | 12/2018 | Feng | .................... H04L 27/0014 |
| 2019/0173612 A1* | 6/2019 | Kimura | ............... H04W 56/001 |
| 2019/0229964 A1* | 7/2019 | Ouchi | .................. H04L 27/2613 |
| 2019/0356451 A1 | 11/2019 | Zhang et al. | |
| 2019/0364585 A1* | 11/2019 | Lee | ........................ H04W 72/12 |
| 2020/0053675 A1* | 2/2020 | Khoryaev | ............. H04W 56/00 |
| 2020/0107311 A1* | 4/2020 | Lee | ........................ H04L 5/0048 |

OTHER PUBLICATIONS

U.S. Appl. No. 62/476,083, 2017, 41 pages.
Intel Corp., "Considerations on Support of Short TTI for LTE V2V Sidelink Communication," 3GPP TSG RAN1 WG Meeting #88bis, R1-1704688, Apr. 3-7, 2017, 12 pages.
Qualcomm Inc., "Study of short TTI for V2X Phase 2," 3GPP TSG-RAN WG1 #88Bis, R1-1705003, Apr. 3-7, 2017, 5 pages.
Huawei, HiSilicon, "Discussion on the necessity of differentiating P-UE and V-UE," R1-1611195, 3GPP TSG RAN WG1 Meeting #87, Reno, USA, dated Nov. 14-18, 2016, 2 pages.
Intel Corporation, "On Support of Higher Order Modulations for L TE V2V Sidelink Communication," R1-1704684, 3GPP TSG RAN1 WG Meeting #88bis, Spokane, USA, dated Apr. 3-7, 2017, 7 pages.
Extended European Search Report in European Application No. 18775522.8, dated Nov. 20, 2019, 9 pages.
U.S. Notice of Allowance in U.S. Appl. No. 16/536,986, dated Jun. 23, 2021, 8 pages.

* cited by examiner

FIG. 7
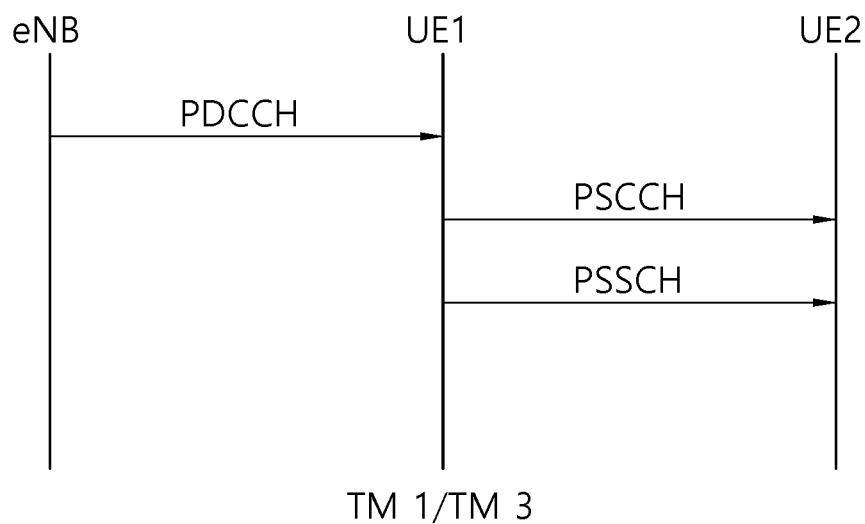
(a)
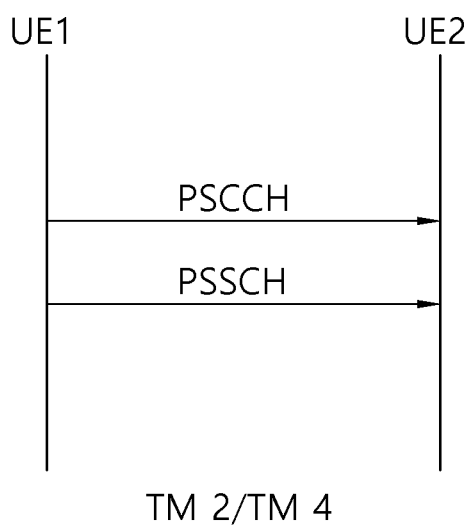
(b)

METHOD FOR TRANSMITTING A SIGNAL OF A USER EQUIPMENT FOR V2X COMMUNICATION IN A WIRELESS COMMUNICATION SYSTEM AND APPARATUS USING THE SAME

CROSS-REFERENCE TO RELATED APPLICATIONS

This application is the National Stage filing under 35 U.S.C. 371 of International Application No. PCT/KR2018/003790 filed on Mar. 30, 2018, which claims the benefit of U.S. Provisional Applications No. 62/479,386 filed on Mar. 31, 2017, No. 62/489,999 filed on Apr. 25, 2017, No. 62/501,764 filed on May 5, 2017, No. 62/505,981 filed on May 14, 2017, No. 62/544,008 filed on Aug. 11, 2017, No. 62/546,570 filed on Aug. 17, 2017, and No. 62/565,120 filed on Sep. 29, 2017. The disclosures of the prior applications are incorporated by reference in their entirety.

BACKGROUND OF THE INVENTION

Field of the Invention

The present invention relates to wireless communication and, more particularly, to a method for transmitting a signal by a user equipment for V2X communication in a wireless communication system and a communication apparatus for using the method.

Related Art

As more and more communication devices require a larger communication capacity, needs for improved mobile broadband communication over conventional radio access technologies (RATs) are emerging. Also, massive Machine Type Communication (MTC) which connects a plurality of devices and objects to each other and provides various services anytime and anywhere is also one of important issues that need to be considered in the next-generation communication.

A new communication system design is under consideration, which takes into account services or terminals sensitive to reliability and latency; the next-generation radio access technology which supports enhanced mobile broadband communication, massive MTC, Ultra-Reliable and Low Latency Communication (URLLC), and so on may be referred to as a new RAT or new radio (NR).

Meanwhile, in the design of NR, vehicle-to-everything (V2X) communication is supported. V2X communication refers to communication between a terminal mounted inside a vehicle and other arbitrary terminal.

When V2X communication is performed, more reference signals are mapped to the resource blocks (RBs) within a transmission time interval (TTI) than communication between a UE and an eNB, and a symbol for automatic gain control (AGC), a symbol for transmission/reception switching time, and so on may be additionally employed. In this respect, a new method for transmitting a V2X signal which takes into account the reference signal mapping, AGC symbol, and symbol for transmission/reception switching time may be needed.

Also, in the V2X communication, due to the increase of reference signal mapping, AGC symbols, symbols for transmission/reception switching time, and so on, available resources per resource block which may be used for mapping/transmitting V2X data are reduced compared with the amount of resources available which may be used for transmitting data for each resource block between a UE and an eNB. Also, a higher modulation order (for example, 64 Quadrature Amplitude Modulation (QAM)) may be used for V2X communication. As a result, coding rate may be increased excessively. Taking into the aforementioned issues, a method and an apparatus for determining a transport block size (TBS) are needed.

SUMMARY OF THE INVENTION

To solve the problem above, an object of the present invention is to provide a method for transmitting a signal by a UE for V2X communication in a wireless communication system and an apparatus using the method.

In one aspect, provided is a method for transmitting a signal by a UE for vehicle-to-everything (V2X) communication in a wireless communication system. The method includes mapping V2X data to resources of a subframe comprising a plurality of symbols in the time domain and transmitting the mapped V2X data to a different UE. Here, resource elements in the last symbol of the subframe are excluded from the mapping process.

The first symbol of the subframe may be a symbol for automatic gain control (AGC), and the last symbol may be a symbol for transmission/reception switching time.

Resource elements in the first symbol of the subframe may be included during the mapping process.

The subframe may comprise 14 symbols in a normal cyclic prefix (CP).

Size of a transport block to be used for transmitting the V2X data may be determined, and the V2X data may be transmitted in units of transport blocks of the determined size.

Size of the transport block may be determined by the number of resource blocks to which the V2X data are transmitted and a transport block size index determined according to a 'modulation and coding scheme (MCS)'.

The number of resource blocks may be calculated in units of legacy resource blocks or effective resource blocks.

The legacy resource block may be determined by the amount of resources to which the V2X data are mapped, excluding two demodulation-reference signal (DM-RS) symbols in one subframe.

The effective resource block may be determined by the amount of resources to which the V2X data are mapped, excluding four DM-RS symbols and 'either of a symbol for automatic gain control (AGC) and a symbol for transmission/reception switching time' in one subframe.

The number of resource blocks may be calculated in units of effective resource blocks when a ProSe priority per packet (PPPP) value of the V2X data, service type, or destination identity (ID) satisfies a predetermined condition.

That the number of resource blocks is calculated in units of the effective resource blocks may be informed to the different UE through a reserved bit of sidelink control information (SCI) transmitted from a physical sidelink control channel (PSCCH).

In another aspect, provided is a user equipment (UE). The UE includes a transceiver transmitting and receiving a radio signal and a processor operating in conjunction with the transceiver. The processor is configured to map V2X data to resources of a subframe comprising a plurality of symbols in the time domain and to transmit the mapped V2X data to a different UE. Here, resource elements in the last symbol of the subframe are excluded from the mapping process.

According to the present invention, coding rate in the subframes involved in V2X communication may be prevented from being increased excessively. Also, since the transport block size is determined and V2X data are mapped to resources by taking into account unique features of the V2X communication, namely a large number of symbols to which reference signals are mapped, symbols for automatic gain control, and symbols for transmission/reception switching time, efficiency of the V2X communication and reception performance may be improved.

BRIEF DESCRIPTION OF THE DRAWINGS

FIG. 7 illustrates a UE operation according to the transmission mode (TM) related to V2X/D2D communication.

DESCRIPTION OF EXEMPLARY EMBODIMENTS

Figure 1:
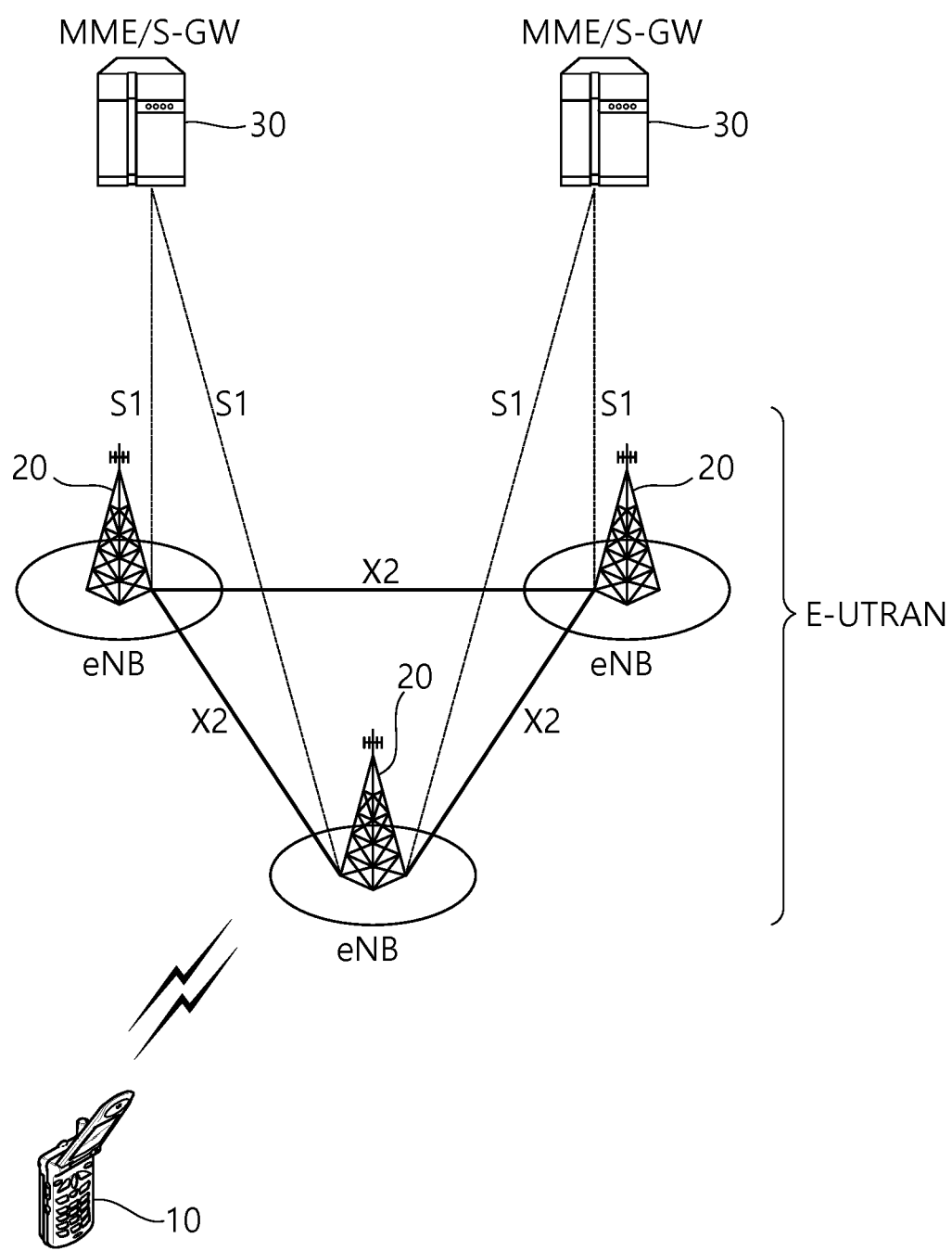
FIG. 1 shows a wireless communication system.

FIG. 1 shows a wireless communication system. The wireless communication system may be referred to as an Evolved-UMTS Terrestrial Radio Access Network (E-UTRAN) or a Long Term Evolution (LTE)/LTE-A system, for example.

The E-UTRAN includes at least one base station (BS) 20 which provides a control plane and a user plane to a user equipment (UE) 10. The UE 10 may be fixed or mobile, and may be referred to as another terminology, such as a mobile station (MS), a user terminal (UT), a subscriber station (SS), a mobile terminal (MT), a wireless device, etc. The BS 20 is generally a fixed station that communicates with the UE 10 and may be referred to as another terminology, such as an evolved node-B (eNB), a base transceiver system (BTS), an access point, etc.

The BSs 20 are interconnected by means of an X2 interface. The BSs 20 are also connected by means of an S1 interface to an evolved packet core (EPC) 30, more specifically, to a mobility management entity (MME) through S1-MME and to a serving gateway (S-GW) through S1-U.

The EPC 30 includes an MME, an S-GW, and a packet data network-gateway (P-GW). The MME has access information of the UE or capability information of the UE, and such information is generally used for mobility management of the UE. The S-GW is a gateway having an E-UTRAN as an end point. The P-GW is a gateway having a PDN as an end point.

Layers of a radio interface protocol between the UE and the network can be classified into a first layer (L1), a second layer (L2), and a third layer (L3) based on the lower three layers of the open system interconnection (OSI) model that is well-known in the communication system. Among them, a physical (PHY) layer belonging to the first layer provides an information transfer service by using a physical channel, and a radio resource control (RRC) layer belonging to the third layer serves to control a radio resource between the UE and the network. For this, the RRC layer exchanges an RRC message between the UE and the BS.

Figure 2:
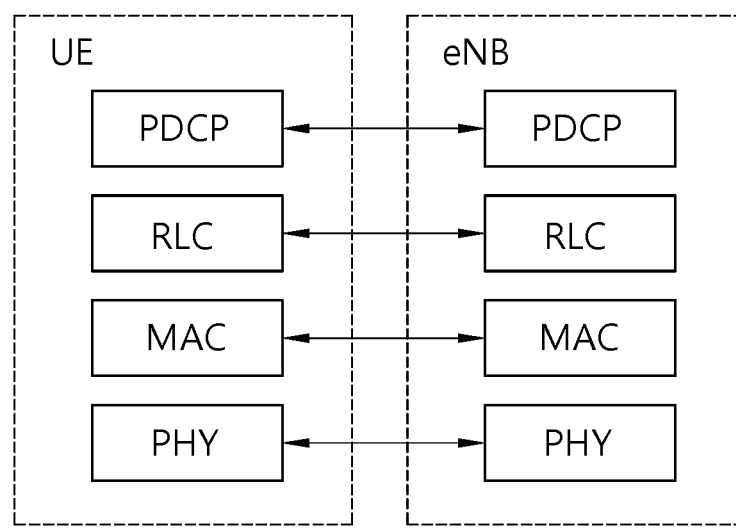
FIG. 2 is a diagram showing a wireless protocol architecture for a user plane.
Figure 3:
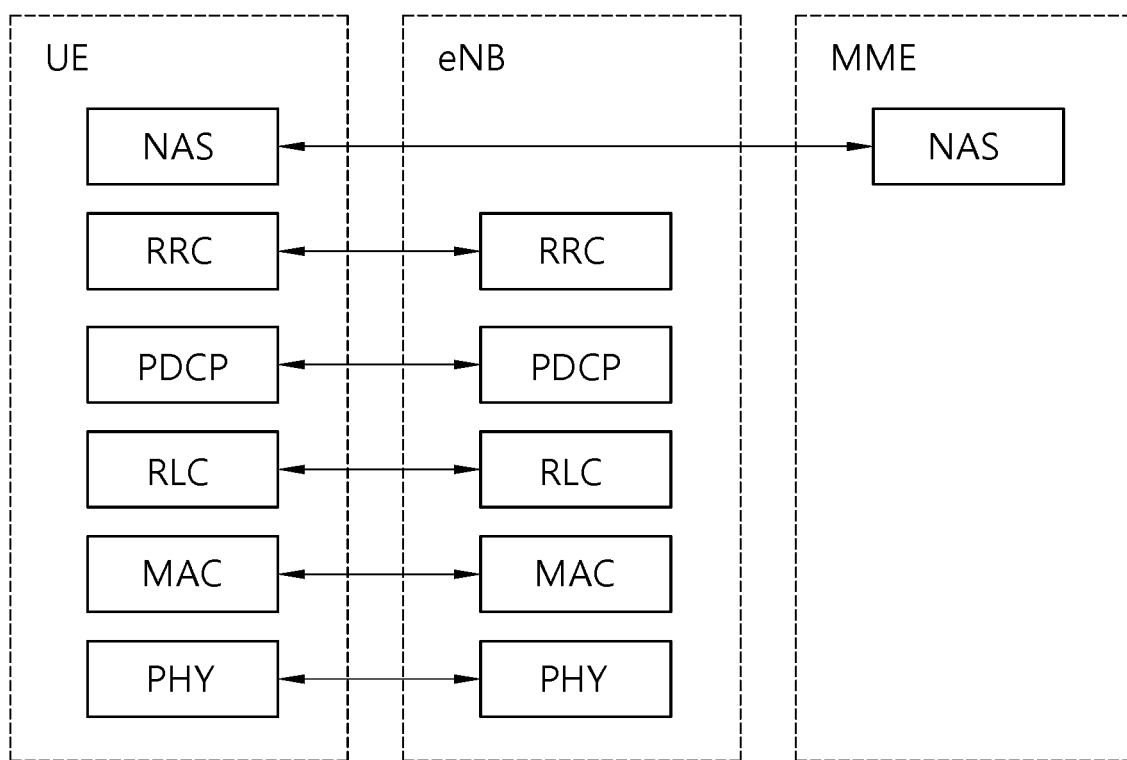
FIG. 3 is a diagram showing a wireless protocol architecture for a control plane.

FIG. 2 is a diagram showing a wireless protocol architecture for a user plane. FIG. 3 is a diagram showing a wireless protocol architecture for a control plane. The user plane is a protocol stack for user data transmission. The control plane is a protocol stack for control signal transmission.

Referring to FIGS. 2 and 3, a PHY layer provides an upper layer with an information transfer service through a physical channel. The PHY layer is connected to a medium access control (MAC) layer which is an upper layer of the PHY layer through a transport channel. Data is transferred between the MAC layer and the PHY layer through the transport channel. The transport channel is classified according to how and with what characteristics data is transferred through a radio interface.

Data is moved between different PHY layers, that is, the PHY layers of a transmitter and a receiver, through a physical channel. The physical channel may be modulated according to an Orthogonal Frequency Division Multiplexing (OFDM) scheme, and use the time and frequency as radio resources.

The functions of the MAC layer include mapping between a logical channel and a transport channel and multiplexing and demultiplexing to a transport block that is provided through a physical channel on the transport channel of a MAC Service Data Unit (SDU) that belongs to a logical channel. The MAC layer provides service to a Radio Link Control (RLC) layer through the logical channel.

The functions of the RLC layer include the concatenation, segmentation, and reassembly of an RLC SDU. In order to guarantee various types of Quality of Service (QoS) required by a Radio Bearer (RB), the RLC layer provides three types of operation mode: Transparent Mode (TM), Unacknowledged Mode (UM), and Acknowledged Mode (AM). AM RLC provides error correction through an Automatic Repeat Request (ARQ).

The RRC layer is defined only on the control plane. The RRC layer is related to the configuration, reconfiguration, and release of radio bearers, and is responsible for control of logical channels, transport channels, and PHY channels. An RB means a logical route that is provided by the first layer (PHY layer) and the second layers (MAC layer, the RLC layer, and the PDCP layer) in order to transfer data between UE and a network.

The function of a Packet Data Convergence Protocol (PDCP) layer on the user plane includes the transfer of user data and header compression and ciphering. The function of the PDCP layer on the user plane further includes the transfer and encryption/integrity protection of control plane data.

What an RB is configured means a process of defining the characteristics of a wireless protocol layer and channels in order to provide specific service and configuring each detailed parameter and operating method. An RB can be divided into two types of a Signaling RB (SRB) and a Data RB (DRB). The SRB is used as a passage through which an RRC message is transmitted on the control plane, and the DRB is used as a passage through which user data is transmitted on the user plane.

If RRC connection is established between the RRC layer of UE and the RRC layer of an E-UTRAN, the UE is in the RRC connected state. If not, the UE is in the RRC idle state.

A downlink transport channel through which data is transmitted from a network to UE includes a broadcast channel (BCH) through which system information is transmitted and a downlink shared channel (SCH) through which user traffic or control messages are transmitted. Traffic or a control message for downlink multicast or broadcast service may be transmitted through the downlink SCH, or may be transmitted through an additional downlink multicast channel (MCH). Meanwhile, an uplink transport channel through which data is transmitted from UE to a network includes a random access channel (RACH) through which an initial control message is transmitted and an uplink shared channel (SCH) through which user traffic or control messages are transmitted.

Logical channels that are placed over the transport channel and that are mapped to the transport channel include a broadcast control channel (BCCH), a paging control channel (PCCH), a common control channel (CCCH), a multicast control channel (MCCH), and a multicast traffic channel (MTCH).

The physical channel includes several OFDM symbols in the time domain and several subcarriers in the frequency domain. One subframe includes a plurality of OFDM symbols in the time domain. An RB is a resources allocation unit, and includes a plurality of OFDM symbols and a plurality of subcarriers. Furthermore, each subframe may use specific subcarriers of specific OFDM symbols (e.g., the first OFDM symbol) of the corresponding subframe for a physical downlink control channel (PDCCH), that is, an L1/L2 control channel. A Transmission Time Interval (TTI) is a unit time for subframe transmission.

In what follows, a new radio access technology (RAT) will be described. The new radio access technology may also be called a new radio for short.

As more and more communication devices require a larger communication capacity, needs for improved mobile broadband communication over conventional radio access technologies (RATs) are emerging. Also, massive Machine Type Communication (MTC) which connects a plurality of devices and objects to each other and provides various services anytime and anywhere is also one of important issues that need to be considered in the next-generation communication. In addition, a new communication system design is under consideration, which takes into account services or terminals sensitive to reliability and latency; adoption of the next-generation radio access technology which supports enhanced mobile broadband communication, massive MTC, Ultra-Reliable and Low Latency Communication (URLLC), and so on is under consideration, which, for the purpose of convenience, is referred to as a new RAT or new radio (NR) in the present invention.

Figure 4:
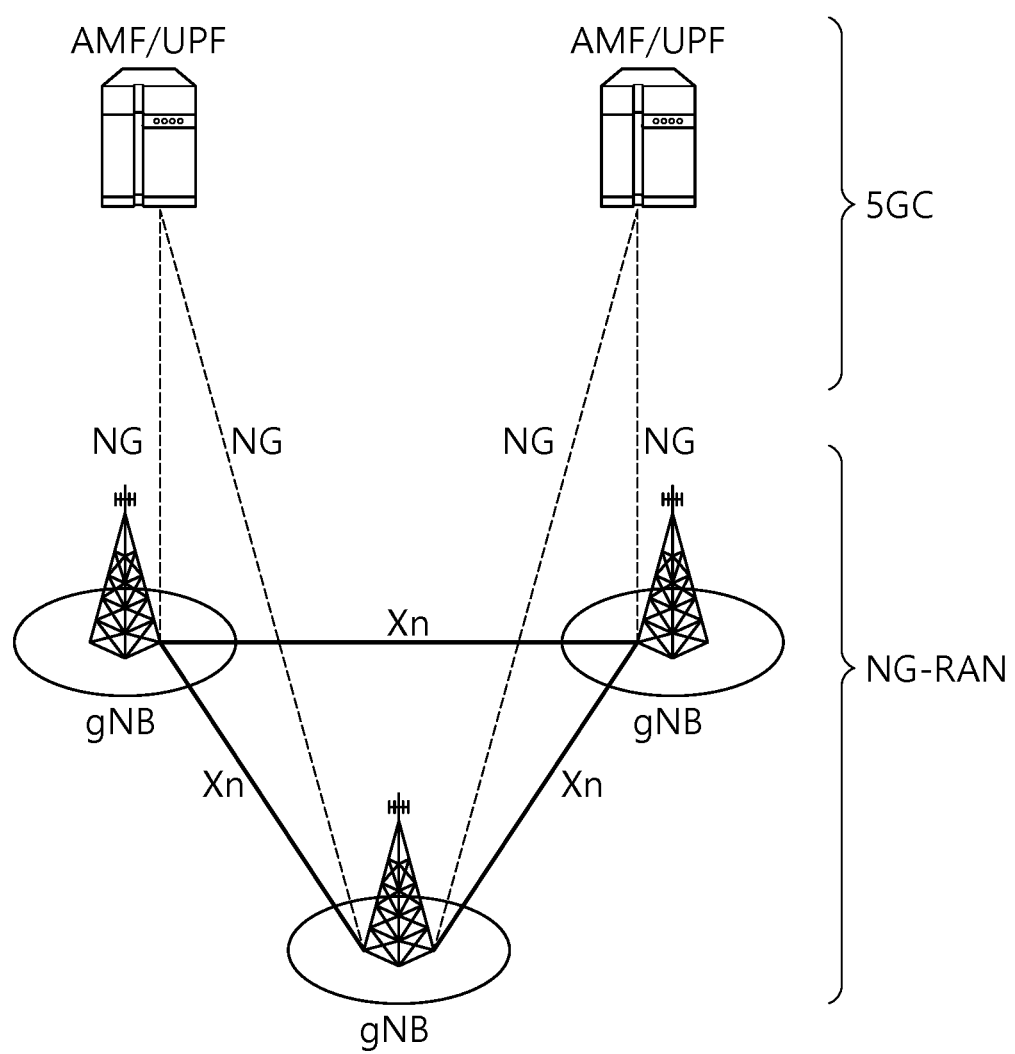
FIG. 4 illustrates a system structure of a new generation radio access network (NG-RAN) to which NR is applied.

FIG. 4 illustrates a system structure of a new generation radio access network (NG-RAN) to which NR is applied.

Referring to FIG. 4, NG-RAN may include a gNB and/or eNB which provides a UE with the user plane and control plane protocol termination. FIG. 4 illustrates the case where only the gNB is included. The gNB and the eNB are connected to each other through the Xn interface. The gNB and the eNB are connected to the 5G core network (5GC) through the NG interface. More specifically, the gNB and the eNB are connected to the access and mobility management function (AMF) through the NG-C interface and to the user plane function (UPF) through the NG-U interface.

Figure 5:
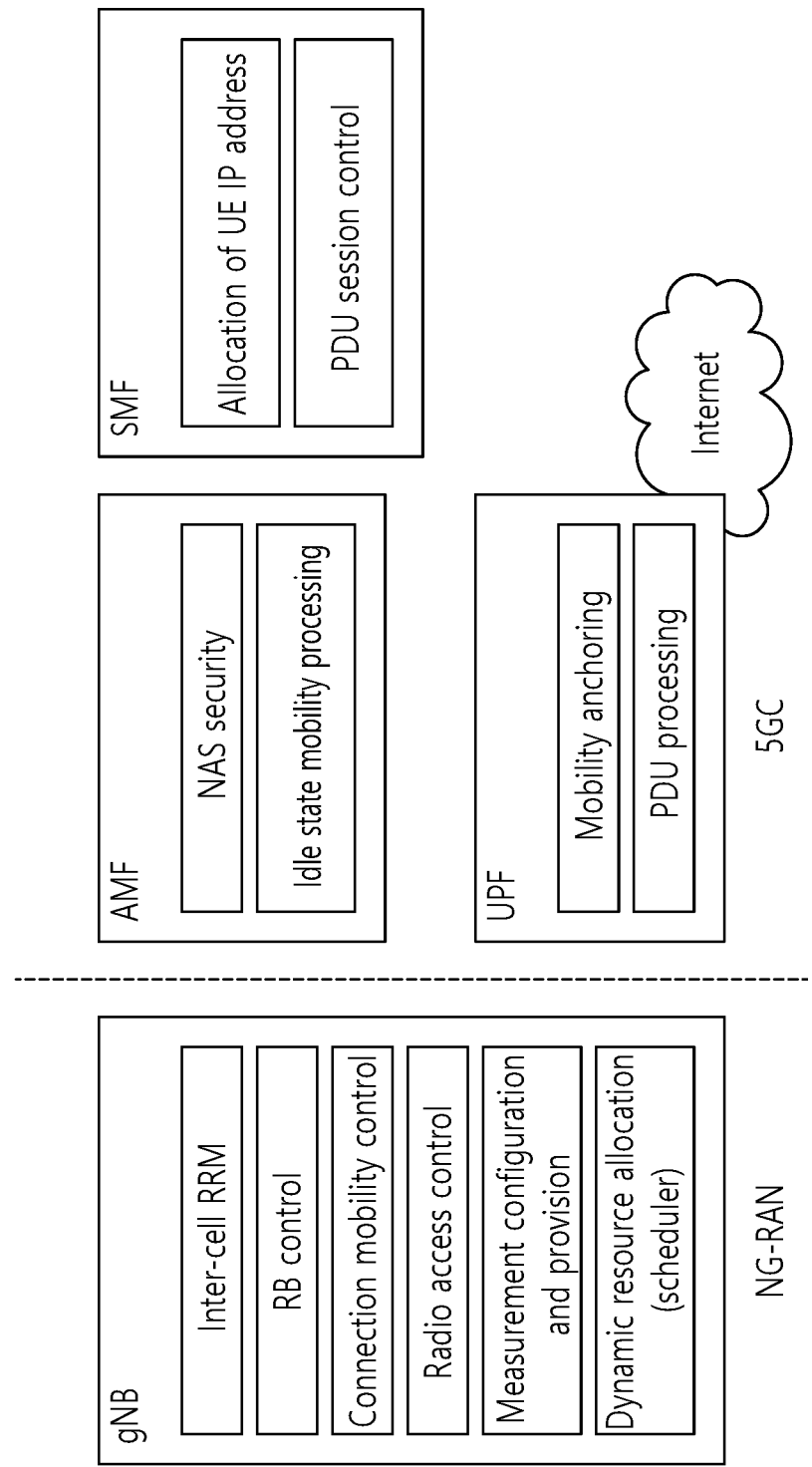
FIG. 5 illustrates a functional division between the NG-RAN and the 5GC.

FIG. 5 illustrates a functional division between the NG-RAN and the 5GC.

Referring to FIG. 5, the gNB may provide functions such as inter-cell radio resource management (RRM), radio bearer (RB) management, connection mobility control, radio admission control, measurement configuration & provision, and dynamic resource allocation. The AMF may provide such functions as NAS security and idle state mobility processing. The UPF may provide such functions as mobility anchoring and PDU processing. The Session Management Function (SMF) may provide functions such as allocation of UE IP address and PDU session control.

The present invention is related to V2X communication and more particularly, to a method for sidelink retransmission. The present invention is described with respect to the V2X communication of the NR but may also be applied to other scenarios including V2V or device-to-device (D2D) communication.

Figure 6:
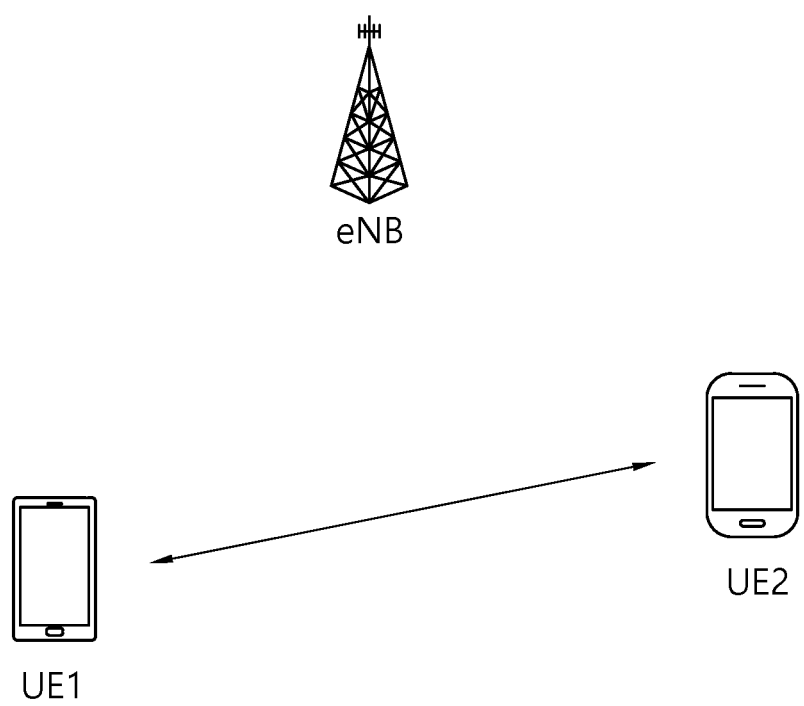
FIG. 6 illustrates UEs performing V2X or D2D communication.

FIG. 6 illustrates UEs performing V2X or D2D communication.

Referring to FIG. 6, in the V2X/D2D communication, the term UE primarily refers to a user terminal. However, when a network device such as an eNB transmits and receives a signal according to a communication scheme employed for UEs, the eNB may also be regarded as a kind of terminal.

UE 1 may operate to select a resource unit corresponding to a specific resource within a resource pool which is a set of series of resources and to transmit a D2D signal by using the corresponding resource unit. UE 2, which is a UE receiving the D2D signal, may be configured for a resource pool to which the UE 1 may transmit a signal and detect the signal transmitted from the UE 1 within the corresponding resource pool.

At this time, if the UE 1 is within coverage of an eNB, the eNB may inform the UE 1 of the resource pool. On the other hand, if the UE 1 lies outside the coverage of the eNB, other UE may inform the UE 1 of the resource pool, or a predetermined resource may be utilized.

In general, a resource pool consists of a plurality of resource units, and each UE may select one or more resource units to transmit its D2D signal.

FIG. 7 illustrates a UE operation according to the transmission mode (TM) related to V2X/D2D communication.

FIG. 7(a) is related to transmission mode 1, 3 while FIG. 7(b) is related to transmission mode 2, 4. In the transmission mode 1, 3, an eNB performs resource scheduling for UE 1 through PDCCH (more specifically, DCI), and the UE 1 performs D2D/V2X communication with UE 2 according to the corresponding resource scheduling. After transmitting Sidelink Control Information (SCI) to the UE 2 through a Physical Sidelink Control Channel (PSCCH), the UE 1 may transmit data based on the SCI through a Physical Sidelink Shared Channel (PSSCH). The transmission mode 1 may be applied to D2D communication while the transmission mode 3 may be applied to V2X communication.

The transmission mode 2, 4 may be referred to as a mode in which a UE performs scheduling autonomously. More specifically, the transmission mode 2 may be applied to D2D communication, and a UE may select a resource by itself within a set resource pool to perform a D2D operation. The transmission mode 4 may be applied to V2X communication, and a UE may select a resource by itself within a selection window through a process such as sensing/SA decoding, after which the UE may perform a V2X operation. After transmitting SCI to the UE 2 through the PSCCH, the UE 1 may transmit data based on the SCI through the PSSCH. In what follows, the transmission mode may be referred to as a mode.

While the control information transmitted by an eNB to a UE through the PDCCH is called downlink control information (DCI), the control information transmitted by a UE to other UEs through the PSCCH may be called SCI. The SCI may be expressed in various formats, for example, SCI format 0 and SCI format 1.

The SCI format 0 may be used for scheduling of the PSSCH. The SCI format 0 may include a frequency hopping flag (1 bit), resource block allocation and hopping resource allocation field (the number of bits of which may differ depending on the number of resource blocks of a sidelink), time resource pattern (7 bit), modulation and coding scheme (MCS) (5 bit), time advance indication (11 bit), and group destination ID (8 bit).

The SCI format 1 may be used for scheduling of the PSSCH. The SCI format 1 may include priority (3 bit), resource reservation (4 bit), frequency resource position of initial transmission and retransmission (the number of bits of which may differ depending on the number of sub-channels of a sidelink), time gap between initial transmission and retransmission (4 bit), MCS (5 bit), retransmission index (1 bit), and reserved information bit. In what follows, the reserved information bit may be called a reserved bit for short. Reserved bits may be added until the bit size of the SCI format 1 becomes 32 bit. In other words, the SCI format 1 includes a plurality of fields, each of which has different information from each other, where the number of remaining bits excluding the total number of bits of the plurality of fields from the total number of fixed bits (32 bit) of the SCI format 1 may be called reserved bits.

The SCI format 0 may be used for the transmission mode 1, 2 while the SCI format 1 may be used for the transmission mode 3, 4.

Figure 8:
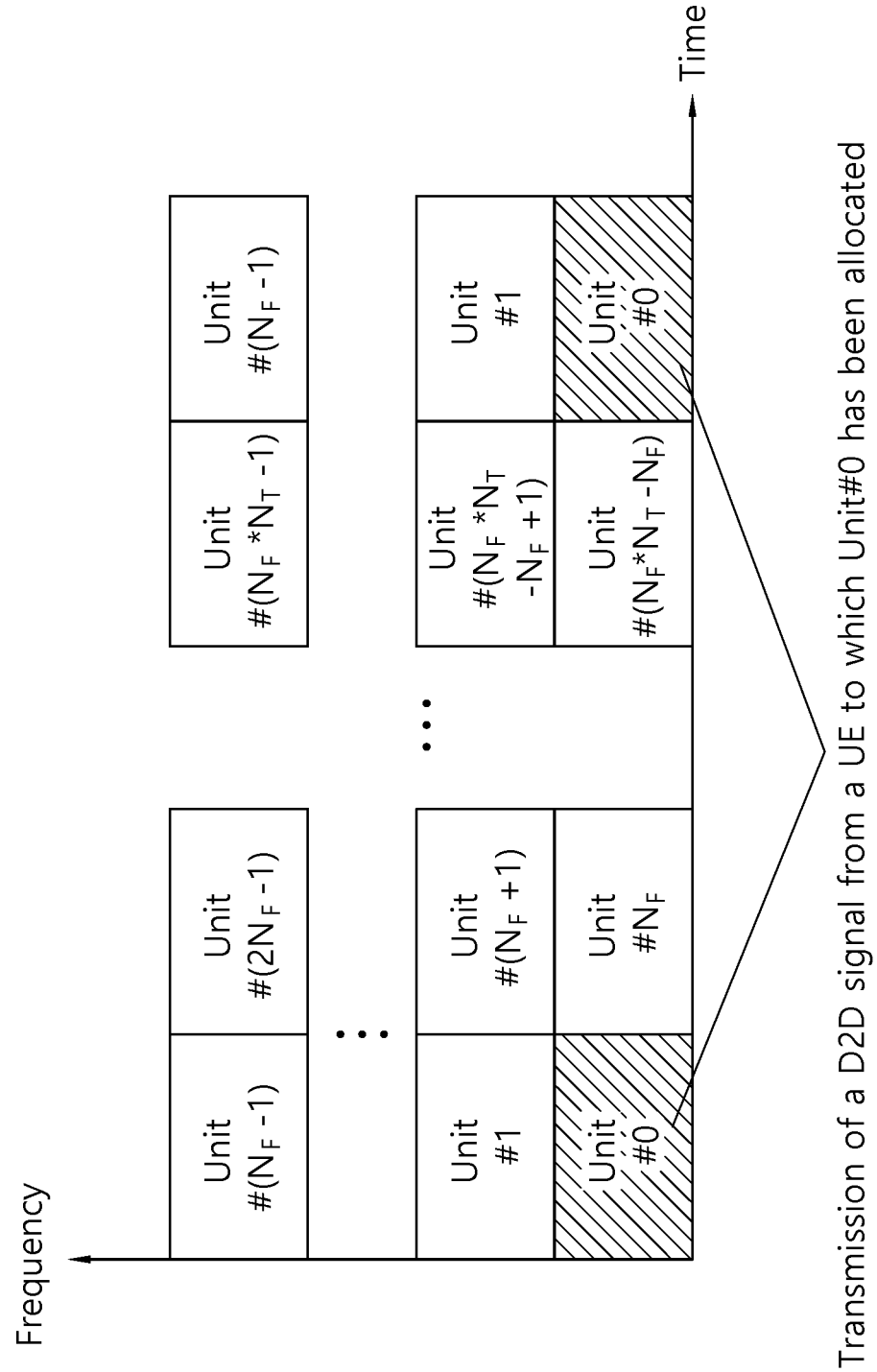
FIG. 8 illustrates an example of a configuration of resource units.

FIG. 8 illustrates an example of a configuration of resource units.

Referring to FIG. 8, the entire frequency resources of a resource pool may be divided into $N_F$ units, and the entire time resources of the resource pool may be divided into $N_T$ units, by which a total of $N_F \times N_T$ resource units may be defined within the resource pool.

At this time, it is assumed that the corresponding resource pool is repeated with a period of $N_T$ subframes.

As shown in FIG. 8, one resource unit (for example, Unit #0) may appear repeatedly at regular intervals. Similarly, to obtain a diversity effect in the time or frequency dimension, the index of a physical resource unit to which one logical resource unit is mapped may vary according to a predetermined pattern as time elapses. In the aforementioned resource unit structure, a resource pool may indicate a set of resource units available for transmission, which may be used by a UE attempting to transmit a D2D signal.

A resource pool may be subdivided into various types. For example, the resource pool may be classified according to the content of a D2D signal transmitted from each resource pool. Each resource pool may be classified as follows, where each resource pool may transmit a D2D signal of which the content is described below.

1) Scheduling Assignment (SA) resource pool or D2D (sidelink) control channel: A resource pool by which each transmitting UE transmits a signal including information about the resource position of a D2D data channel transmitted from a succeeding or the same subframe and information required for demodulation of the other data channels (for example, information about modulation and coding scheme (MCS), MIMO transmission scheme, and timing advance).

The signal described in 1) may be transmitted together with D2D data after being multiplexed on the same resource unit. In this case, an SA resource pool may indicate a resource pool to which SA is transmitted by being multiplexed with D2D data. The SA resource pool may also be called a D2D (sidelink) control channel.

2) D2D data channel: A resource pool by which a transmitting UE transmits user data by using a resource designated through SA. If it is possible that D2D data and SA information are multiplexed and transmitted together on the same resource unit, a resource pool for a D2D data channel may transmit only the D2D data channel in such a way to exclude the SA information. In other words, the D2D data channel resource pool still uses the resource element which has been used for transmitting SA information on the basis of individual resource units within the SA resource pool.

3) Discovery channel: A resource pool for messages by which a transmitting UE transmits information such as its identity (ID) so that a neighboring UE may discover the transmitting UE.

Even if a D2D signal carries the same content as described above, a different resource pool may be utilized depending on the transmission and reception attributes of the D2D signal. As one example, even if the same D2D data channel or the same discovery message is transmitted, the resource pool may be further classified into another different resource pool depending on a scheme for determining transmission timing of the D2D signal (for example, whether the D2D signal is transmitted at the time of receiving a synchronization reference signal or transmitted after a predetermined timing advance is applied at the time of receiving the synchronization reference signal), resource allocation scheme (for example, whether a transmission resource of an individual signal is allocated by an eNB for each individual transmitting UE or whether an individual transmitting UE selects an individual signal transmission resource by itself within the resource pool), signal format (for example, the number of symbols occupied by each D2D signal in one subframe or the number of subframes used for transmission of one D2D signal), strength of a signal from the eNB, or transmission power intensity of a D2D UE).

As described above, the method in D2D communication for indicating a transmission resource of a D2D transmitting UE directly by the eNB may be called a mode 1 while the method for selecting a transmission resource directly by the UE, where a transmission resource region is predetermined or the eNB designates the transmission resource region, may be called a mode 2.

In the case of D2D discovery, the case where the eNB directly indicates a resource may be referred to as type 2 while the case where the UE directly selects a transmission resource from a predetermined resource region or a resource region indicated by the eNB may be referred to as type 1.

Meanwhile, the D2D may also be called sidelink. The SA may also be called a physical sidelink control channel (PSCCH), and D2D synchronization signal may also be called a sidelink synchronization signal (SSS). A control channel which transmits the most basic information before initiation of D2D communication is referred to as a physical sidelink broadcast channel (PSBCH), where the PSBCH may be transmitted together with an SSS and may alternatively called a physical D2D synchronization channel (PD2DSCH). A signal notifying that a specific UE is located in the vicinity may include an ID of the specific UE, and a channel to which such a signal is transmitted may be called a physical sidelink discovery channel (PSDCH).

In the D2D communication, only the D2D communication UE transmits a PSBCH together with an SSS, and in this reason, measurement of an SSS has been performed by using a demodulation reference signal (DM-RS) of the PSBCH. A UE in the out-coverage area may measure the DM-RS of the PSBCH and measure reference signal received power (RSRP) of the signal to determine whether the UE itself operate as a synchronization source.

In the 3GPP LTE system, the time needed to transmit user data or control information from one subframe is called transmission time interval (TTI). The TTI of the current LTE system is 1 millisecond (ms) for most cases.

However, in a next-generation wireless communication system for coping with a channel environment changing fast due to a higher data rate, high speed of a vehicle UE mounted in a vehicle, and so on, the current TTI of 1 ms may not be suitable for low latency requirement. Therefore, instead of using the conventional TTI, it may be needed to satisfy the low latency requirement by employing a short TTI (which may also be called an S-TTI) consisting of a smaller number of symbols. The conventional TTI (1 ms) may be referred to as L-TTI in contrast to the S-TTI.

A change may be needed in the conventional design of a demodulation-reference signal (DM-RS) of sidelink for LTE vehicle-to-everything (V2X) communication. In other words, when an S-TTI comprising a smaller number of symbols is used, a design change such as change of the number of symbols in the legacy DM-RS may be required. In this case, automatic gain control (AGC), timing advance (TA), and frequency offset may be taken into account.

In what follows, a new design of the DM-RS in the sidelink of the LTE system will be described. The new design may be applied, for example, when an S-TTI is used for sidelink communication.

Figure 9:
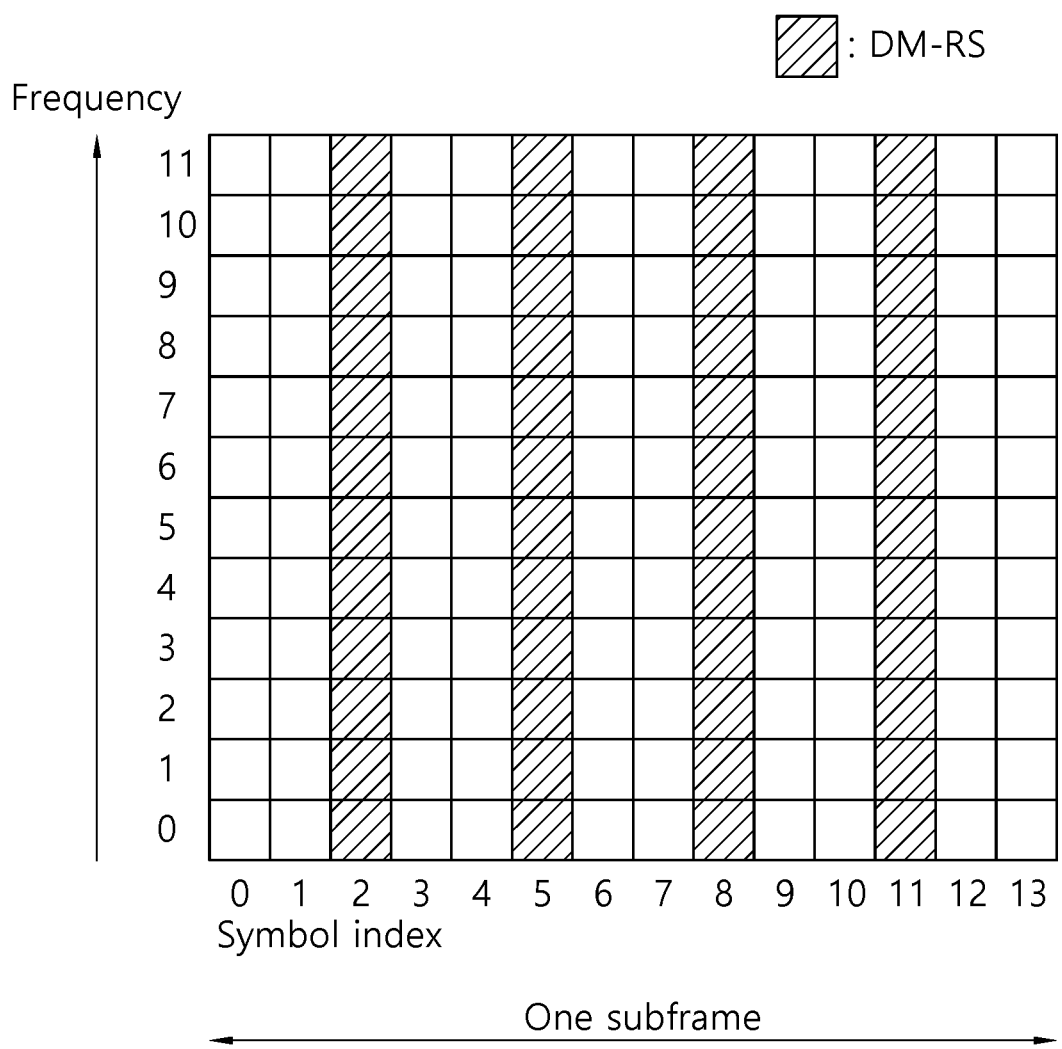
FIG. 9 illustrates one example of a DM-RS structure for a normal CP in the V2X communication.

In the LTE V2X communication, a subframe structure based on the legacy LTE PUSCH structure may be utilized, where FIG. 9 shows the DM-RS structure for a normal CP within a subframe.

FIG. 9 illustrates one example of a DM-RS structure for a normal CP in the V2X communication.

Referring to FIG. 9, if 14 symbols belonging to a subframe are indexed sequentially from 0 to 13, a DM-RS may be transmitted through the symbol #2, 5, 8, and 11. In other words, the DM-RS may be mapped to the symbol #2, 5, 8, and 11 of the subframe.

The current DM-RS structure as described above uses 4 DM-RSs during one TTI (1 ms) with spacing of 2 symbols to compensate for the frequency offset of +/−0.4 ppm in a vehicle UE moving with a high speed at 5.9 GHz for V2X communication.

Figure 10:
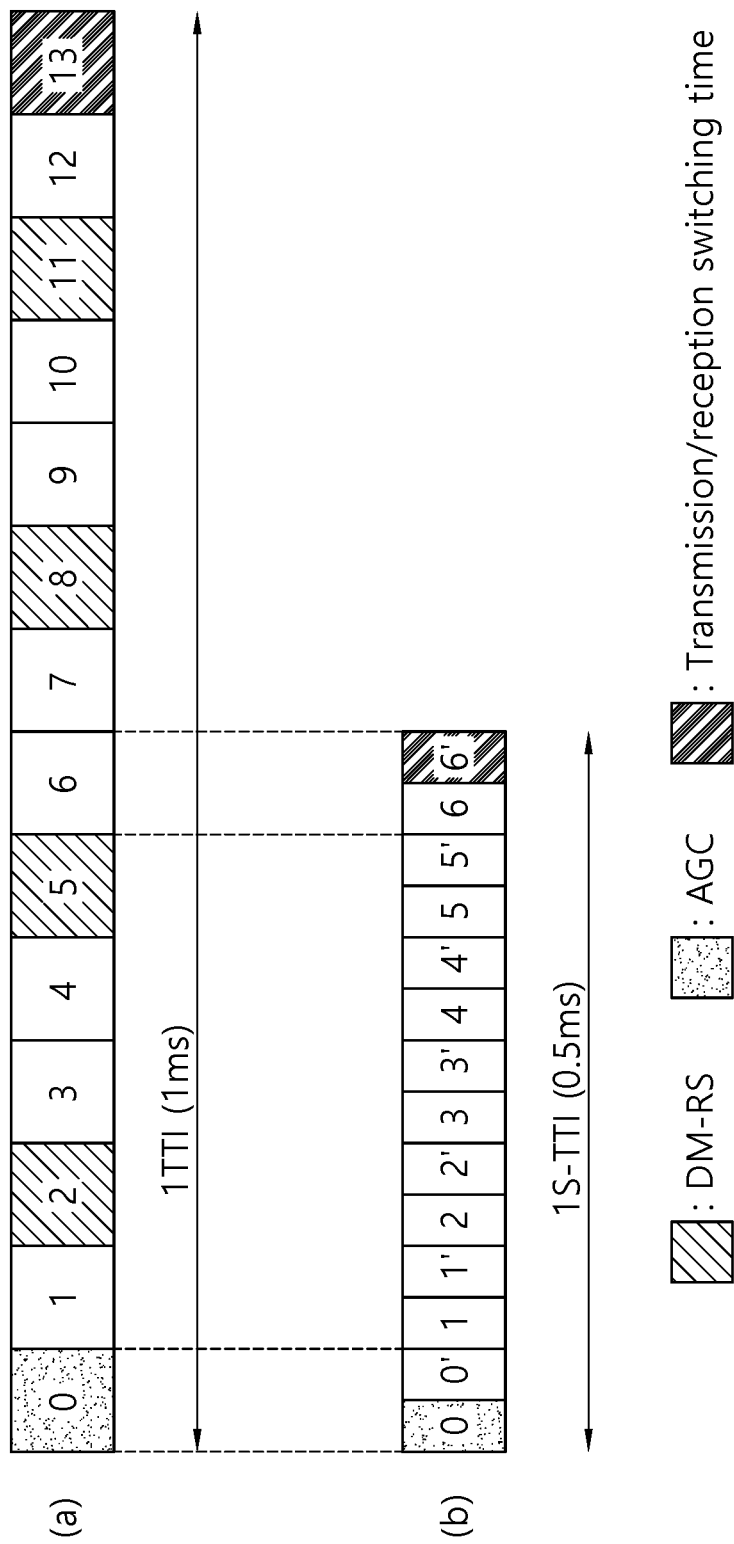
FIG. 10 illustrates an L-TTI and an S-TTI for the purpose of comparison.

FIG. 10 illustrates an L-TTI and an S-TTI for the purpose of comparison.

Referring to FIG. 10(a), an OFDM symbol using a normal CP may use 14 symbols during one L-TTI (1 ms), which may be numbered with a symbol number ranging from 0 to 13. One symbol time is 70 μs (microsecond) for the case of symbol #0 while it is about 66.6 μs for the other symbols. At this time, a total of 8 symbols comprising symbol #1, 3, 4, 6, 7, 9, 10, and 12 correspond to the region within the subframe, which may be used for data transmission in the sidelink communication.

The symbol #0 and the symbol #13 may be used sequentially for automatic gain control (AGC) and transmission/reception switching. However, the time required for actual AGC may occupy about 30 μs out of 70 μs of the symbol #0, and in the same way, the transmission/reception switching time may require a similar amount of time (about 30 μs).

If 1 S-TTI is configured to occupy half of 1 ms, 0.5 ms (namely 1 slot) and to have 14 symbols within the time period of 0.5 ms, the 1 S-TTI (1 slot) may be constructed as shown in FIG. 10(b). At this time, the 14 symbols within 1 S-TTI may be indexed as shown in FIG. 10(b). As shown in FIG. 10(b), the present invention may describe a DM-RS design for the remaining symbols except for the symbol #0 and the symbol #6' in the S-TTI lasting 0.5 ms.

Figure 11:
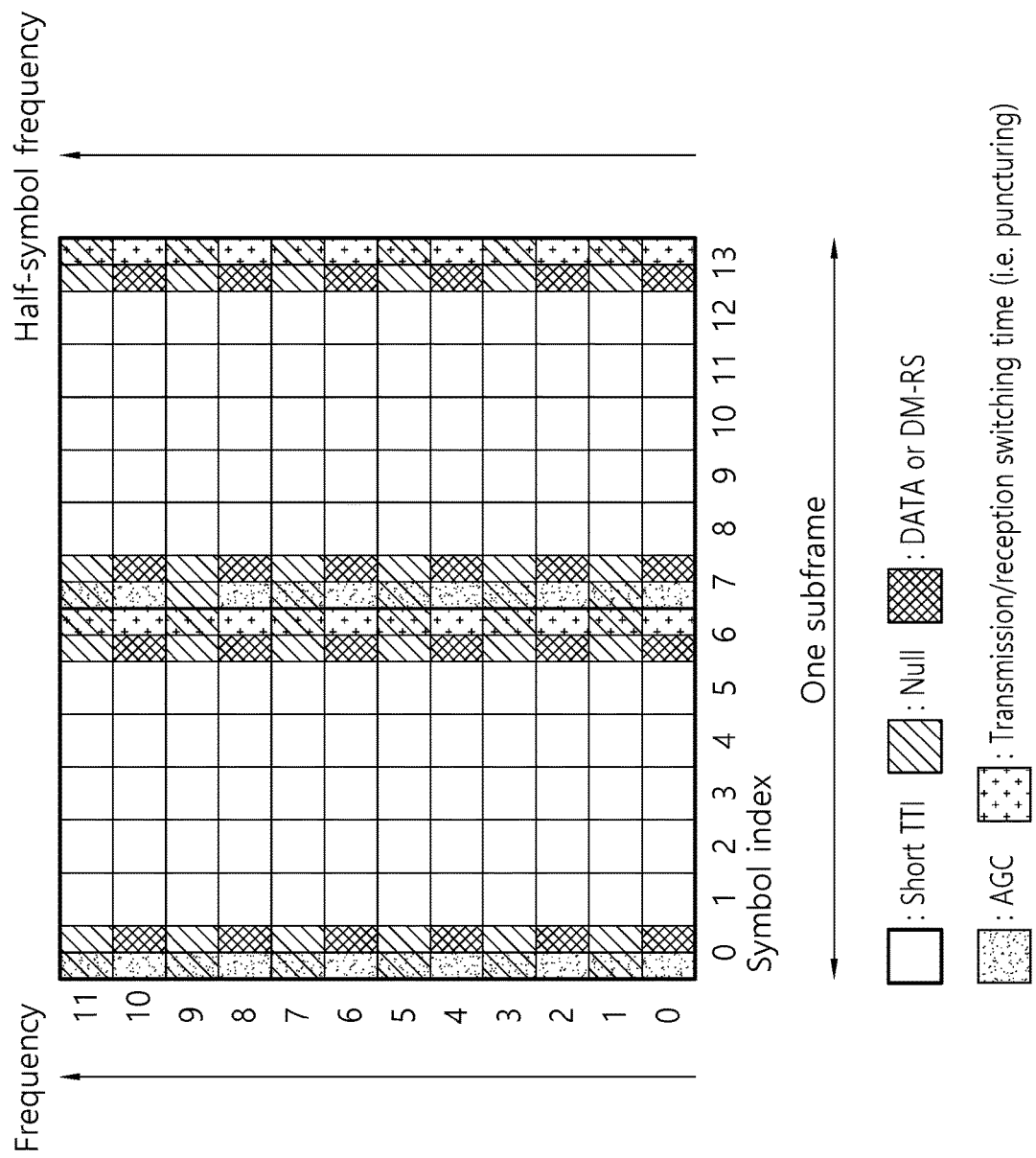
FIG. 11 illustrates one example of a DM-RS design.

FIG. 11 illustrates one example of a DM-RS design.

Referring to FIG. 11, the first/last symbols (where, for the case of 15 kHz subcarrier spacing) one symbol may indicate one OFDM symbol) to be used for AGC and switching time within 1 S-TTI may correspond to symbol #0, #6 or symbol #7, #13. At this time, one of the following two types (type A and type B) may specify the transmission method for the first/last symbols.

First, type A refers to a method for transmitting data and/or a reference signal by using one symbol along the time axis and using a comb-like pattern along the frequency axis. A comb-like pattern may be a pattern comprising subcarriers separated from each other at regular intervals in the frequency domain. For example, a pattern comprising even-numbered subcarriers and a pattern comprising odd-numbered subcarriers may become the comb-like pattern.

Meanwhile, type B refers to a method for transmitting data and/or a reference signal by using 0.5 symbol along the time axis and using subcarrier spacing two times wider than the subcarrier spacing of the LTE system along the frequency axis. Since the subcarrier spacing in the LTE system is 15 kHz, the subcarrier spacing in the type B becomes 30 kHz.

If a signal is transmitted by employing the comb-like pattern of type A, the signal is repeated in the time domain (as in the case of a sounding reference signal (SRS) for uplink transmission). By using this property, half of the time-domain signal repeated in the receiving end may be used for AGC, and the other half may be used for data or a reference signal.

Although type B may increase complexity of a UE compared with the legacy LTE system (because the subcarrier spacing varies under S-TTI situation), it may be considered to be adopted for advanced UEs.

If the first/last symbols are set to have the same form, an advantageous effect of reducing implementation complexity may be obtained. The present invention describes a DM-RS design by using type A or type B of the method for transmitting the first/last symbols within the S-TTI.

As one example, when type A is adopted and even-numbered subcarriers are used, the DM-RS may be designed as shown in FIG. 11. In other words, as shown in FIG. 11, even-numbered subcarriers symbol #0 and #6 within 1 S-TTI may map/transmit data or a DM-RS according to the comb-like pattern. As described above, if data or a DM-RS is mapped in the comb-like pattern, empty resource elements (REs) are generated along the frequency axis; if data are not to be transmitted to the locations of empty REs, rate matching or puncturing may be applied to the corresponding locations. Rate matching/puncturing will be described later.

In the case of FIG. 11, since rate matching or puncturing may be applied to each symbol of the empty resource elements along the frequency axis for symbol #0 and #6, a total of 4 different cases may be configured. Also, although FIG. 11 illustrates applying the comb-like pattern to even-numbered subcarriers, the comb-like pattern may also be applied to odd-numbered subcarriers.

Figure 12:
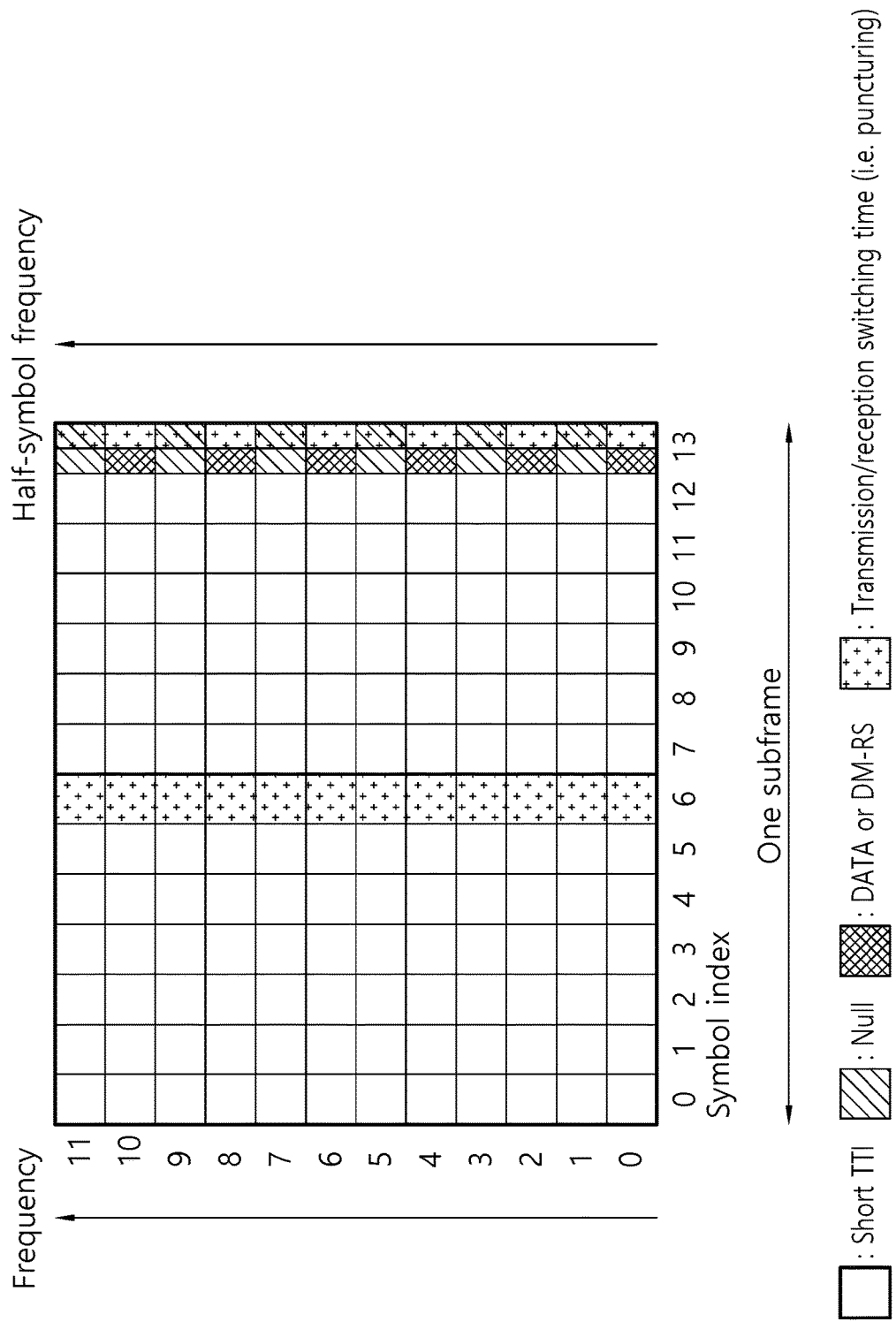
FIG. 12 illustrates another example of a DM-RS design.

FIG. 12 illustrates another example of a DM-RS design.

Referring to FIG. 12, puncturing is applied to symbol #6, the last symbol of the first S-TTI (slot) of the two S-TTIs in one subframe, so that the symbol #6 may be used for transmission/reception switching time, and symbol #13, the last symbol of the second slot, may transmit data or a reference signal according to the comb-like pattern.

The reason why only the symbol #13, the last symbol of the second slot, transmits data or a reference signal according to the comb-like pattern whereas symbol #6, the last symbol of the first slot, does not employ the comb-like pattern for transmission is to take into account the fact that since legacy UEs use the last symbol of the first slot for data reception, the result of IFFT which requires a signal repeated twice in the time domain is not guaranteed even if an advanced UE transmits the last symbol of the first slot according to the comb-like pattern.

At this time, symbol #1 to #5 and symbol #8 to #12 may transmit data or a reference signal, symbol #0 and #7 to be used for AGC may transmit data or a reference signal according to the comb-like pattern (type A) or in the form of a half symbol (type B) or according to the legacy method (1 symbol along the time axis and 15 kHz along the frequency axis).

More specifically, a method for mapping data according to type A scheme (namely comb-like pattern) may be performed in two different ways irrespective of whether a symbol is the first or the last one within one S-TTI.

The first method uses one-half of the discrete Fourier transform (DFT) spreading size for the symbols mapped according to the comb-like pattern. In other words, only the resource elements containing non-zero data may be collected, DFT spreading with respect to the size of the REs may be applied, and REs may be mapped for every two elements in the actual mapping phase for subcarriers. If inverse fast Fourier transform (IFFT) is applied at this phase, a repeated signal may be obtained in the time domain.

The second method first maps symbols by adding zeroes thereto and applies DFT by setting the DFT size to be the same as used for other symbols. In this way, two repeating sequences are obtained in the frequency domain, and '0 (zero)s' are inserted into one of the repeating sequences according to the comb-like pattern in the frequency domain, by which subcarrier mapping is performed. According to the process, a signal repeated twice in the time domain is obtained from IFFT, and thereby the receiving end may use half of the signal for AGC.

Figure 13:
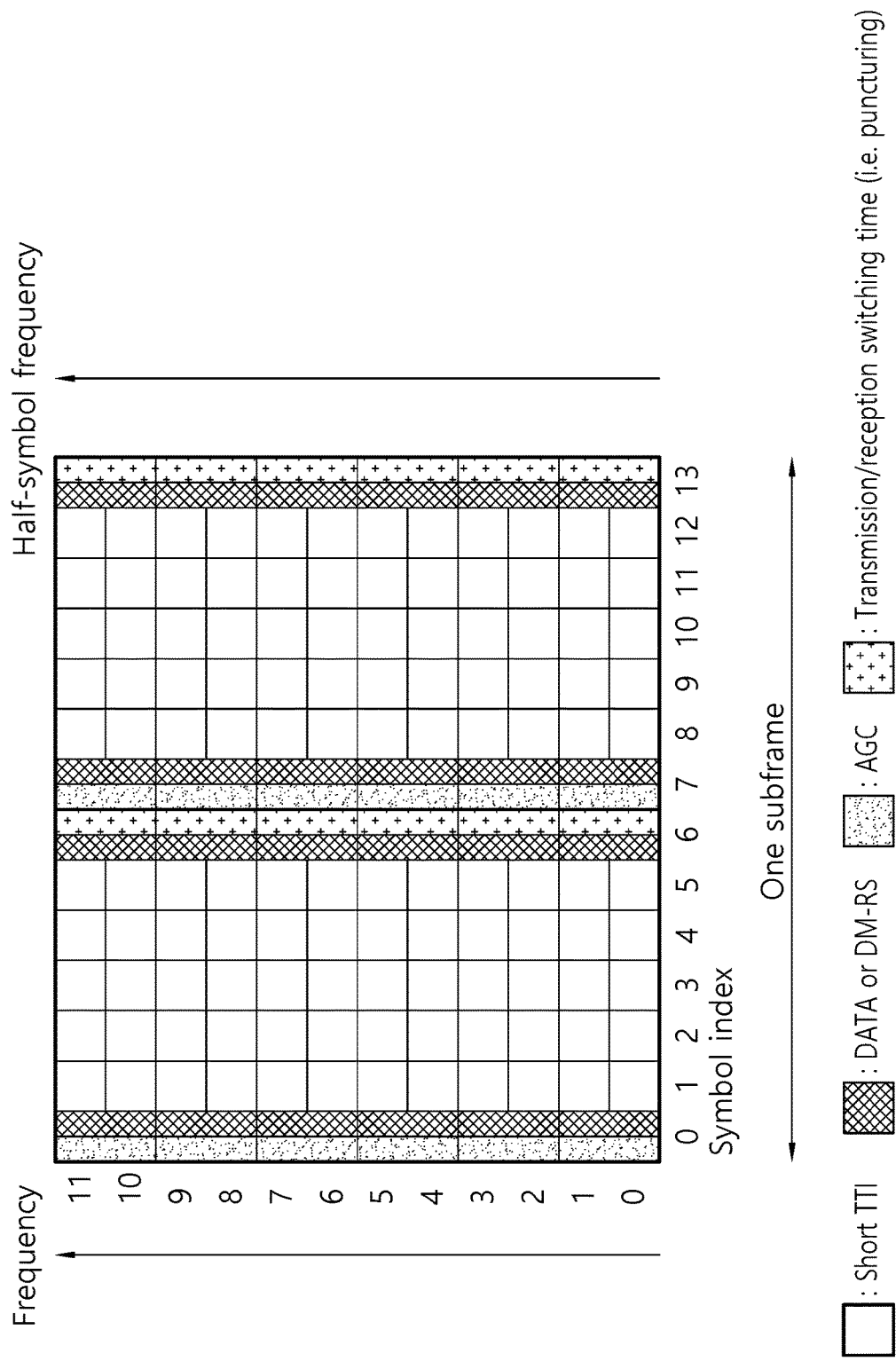
FIG. 13 illustrates yet another example of a DM-RS design.

FIG. 13 illustrates yet another example of a DM-RS design.

Referring to FIG. 13, the first/last symbol within 1 S-TTI may be transmitted according to the type B method. In other words, at symbol #0 and #6, half-symbols may be used for transmission of data or a DM-RS.

As one example, when half-symbol is used for data transmission at the symbol #0, repetitive data, a known signal, or an arbitrary signal taking into account AGC may be transmitted to the preceding half-symbol of the symbol #0 to be used as an AGC signal at the receiving end.

When half-symbols of the symbol #0 and #6 are used for DM-RS transmission, a repetitive reference signal may be disposed in the preceding half-symbol of the symbol #0 and #6 to be used for AGC in the same manner, and at the same time, a gain for channel estimation about the remaining half-symbol may be obtained.

In the description above, a method for transmitting the first/last symbol within 1 S-TTI to be used for AGC and transmission/reception switching time has been specified. In what follows, the aforementioned transmission type is assumed, and a method for transmitting data/DM-RS at the remaining symbols will be proposed.

The following three methods are available for transmission of data and a DM-RS.

The first method employs the comb-like pattern. Since transmission data rate is reduced by half when data are transmitted according to the first method, this method may be used for a specific purpose.

The second method employs transmitting data and a DM-RS to a half-symbol. For example, when a DM-RS is transmitted according to the type B scheme, this method may reduce the design complexity.

The third method employs transmitting data and a DM-RS by using a band of 15 kHz along the frequency axis and one symbol along the time axis as in the legacy LTE system. For example, only the first/last symbol is transmitted by a different method (for example, the aforementioned first and second method) while the remaining symbols within the S-TTI may be transmitted according to a legacy method.

In what follows, the present invention will be described.

When an S-TTI is applied or a high MCS is used in the V2X communication, the present invention proposes rules for TBS selection and other rules. Also, for the first symbol to be used for AGC within one S-TTI and the last symbol to be used for transmission/reception switching time, a rule for decoding selection based on rate matching or puncturing in view of a receiver will also be proposed.

Here, rate matching refers to mapping modulation symbols sequentially only to the available resource elements except for those resource elements which may not be actually used while puncturing may refer to the process in which modulation symbols are mapped by initially assuming that all of the resource elements are available, but a transmitter may not transmit a signal to the resource elements which are in fact unusable, or a receiver empties the corresponding signal. In other words, while rate matching excludes a resource element which is not available during a process of mapping data to resources, puncturing may perform the mapping process by including even the resource element which is not available. However, in the resource element which is not available, the transmitter does not actually transmit a signal, or even if the signal is transmitted, a receiving UE may empty the corresponding signal from the corresponding resource in the puncturing.

The present invention proposes rules for TBS selection and other rules using an effective RB as a method for reducing effective coding rate which increases when an S-TTI or a high MCS is used due to overhead generated from an additional DM-RS, 1 symbol to be used for AGC, and 1 symbol used for transmission/reception switching.

Although the present invention has been described in the context of V2X sidelink communication, the present invention may still be applied to a method for reducing effective coding rate which increases due to additional overhead and a high MCS according to an S-TTI considered in the NR and/or a new design for the NR.

First, to help understanding the invention, what is proposed by the present invention may be summarized as follows.

The LTE system maintains a TBS table for a full TTI length (1 ms, L-TTI). This TBS table defines the transport block size (TBS) for transport blocks which may be transmitted according to the ITBS of a UE and the number of (physical) resources blocks (RBs) allocated. The following table illustrates part of the TBS table for the full TTI length (1 ms).

TABLE 1

| $I_{TBS}$ | \multicolumn{10}{c|}{$N_{PRB}$} |
|---|---|---|---|---|---|---|---|---|---|---|
|  | 1 | 2 | 3 | 4 | 5 | 6 | 7 | 8 | 9 | 10 |
| 0 | 16 | 32 | 56 | 88 | 120 | 152 | 176 | 208 | 224 | 256 |
| 1 | 24 | 56 | 88 | 144 | 176 | 208 | 224 | 256 | 328 | 344 |
| 2 | 32 | 72 | 144 | 176 | 208 | 256 | 296 | 328 | 376 | 424 |
| 3 | 40 | 104 | 176 | 208 | 256 | 328 | 392 | 440 | 504 | 568 |
| 4 | 56 | 120 | 208 | 256 | 328 | 408 | 488 | 552 | 632 | 696 |
| 5 | 72 | 144 | 224 | 328 | 424 | 504 | 600 | 680 | 776 | 872 |
| 6 | 328 | 176 | 256 | 392 | 504 | 600 | 712 | 808 | 936 | 1032 |
| 7 | 104 | 224 | 328 | 472 | 584 | 712 | 840 | 968 | 1096 | 1224 |
| 8 | 120 | 256 | 392 | 536 | 680 | 808 | 968 | 1096 | 1256 | 1384 |
| 9 | 136 | 296 | 456 | 616 | 776 | 936 | 1096 | 1256 | 1416 | 1544 |
| 10 | 144 | 328 | 504 | 680 | 872 | 1032 | 1224 | 1384 | 1544 | 1736 |
| 11 | 176 | 376 | 584 | 776 | 1000 | 1192 | 1384 | 1608 | 1800 | 2024 |
| 12 | 208 | 440 | 680 | 904 | 1128 | 1352 | 1608 | 1800 | 2024 | 2280 |

In Table 1, $I_{TBS}$ represents the TBS index given according to the MCS index ($I_{MCS}$). As shown in Table 1, the transport block size (TBS) may be defined according to the $I_{TBS}$ and the number $N_{PRB}$ of (physical) RBs allocated. For example, if the number of allocated resource blocks is 10, and $I_{TBS}$ is set to 10, TBS may be determined as 1736 bits.

Meanwhile, $I_{TBS}$ may be given as follows according to the MCS index ($I_{MCS}$) determined by the modulation order.

Table 2 below illustrates the relationship between $I_{TBS}$ and the MCS index ($I_{MCS}$).

TABLE 2

| MCS Index $I_{MCS}$ | Modulation Order $Q_m$ | TBS Index $I_{TBS}$ |
|---|---|---|
| 0 | 2 | 0 |
| 1 | 2 | 1 |
| 2 | 2 | 2 |
| 3 | 2 | 3 |
| 4 | 2 | 4 |
| 5 | 2 | 5 |
| 6 | 2 | 6 |
| 7 | 2 | 7 |
| 8 | 2 | 8 |
| 9 | 2 | 9 |
| 10 | 4 | 9 |
| 11 | 4 | 10 |
| 12 | 4 | 11 |
| 13 | 4 | 12 |
| 14 | 4 | 13 |
| 15 | 4 | 14 |
| 16 | 4 | 15 |

TABLE 2-continued

| MCS Index $I_{MCS}$ | Modulation Order $Q_m$ | TBS Index $I_{TBS}$ |
|---|---|---|
| 17 | 6 | 15 |
| 18 | 6 | 16 |
| 19 | 6 | 17 |
| 20 | 6 | 18 |
| 21 | 6 | 19 |
| 22 | 6 | 20 |
| 23 | 6 | 21 |
| 24 | 6 | 22 |
| 25 | 6 | 23 |
| 26 | 6 | 24 |
| 27 | 6 | 25 |
| 28 | 6 | 26 |
| 29 | 2 | reserved |

TABLE 2-continued

| MCS Index $I_{MCS}$ | Modulation Order $Q_m$ | TBS Index $I_{TBS}$ |
|---|---|---|
| 30 | 4 |  |
| 31 | 6 |  |

The current TBS table takes into account the fact that one full TTI (1 ms) may not utilize part of symbols (for example, a symbol to which a DM-RS is transmitted) but does not consider the fact that another symbol may be further prevented from being utilized in the sidelink communication.

As one example, two DM-RSs may be used additionally for the sidelink communication to increase the channel estimation performance which is degraded due to Doppler effect at a high speed, and 1 symbol for AGC settling time and 1 symbol for transmission/reception switching time may be used additionally. Because of the additional overhead above, effective resource elements by which data may be mapped/transmitted within a resource block are reduced, and eventually the effective coding rate of a UE is increased, which causes a problem that a TBS corresponding to part of $I_{TBS}$ may not be used.

To solve the problem, the present invention may adjust the TB size by taking into account the symbols which may not be used additionally in one full TTI. Detailed descriptions of the operation will be described below.

As another example, the same problem occurs in the case of S-TTI (for example, TTI in a slot unit or unit smaller than slot). Currently, V2X communication and NR communication considers adopting S-TTI to achieve low latency. If S-TTI is adopted, communication based on the current TBS table may not support all of the MCS levels due to similar reasons described above. Therefore, adjustment of TBS, which will be specified below, may be needed.

Now examined will be the change of coding rate due to adoption of S-TTI for sidelink communication and/or higher modulation (for example, 64 QAM). According to the conventional sidelink transmission, a transmitting UE which has received 10 RBs, for example, calculates the (effective) coding rate by using resource elements (REs) of the remaining symbols except for six reserved symbols (4 DM-RSs, 1 AGC, and 1 transmission/reception switching time) from each of the 10 RBs. At this time, as one example, if S-TTI is applied, a data region for transmission is reduced, and therefore, the coding rate is shifted to a higher coding rate than the L-TTI case (in the same way, if modulation is used, too, the coding rate calculated for given resources becomes high). Therefore, if slot-based S-TTI is used when TBS is selected, transmission may be performed by using a TBS reduced to the half of the original value.

However, since sidelink transmission has to consider puncturing or rate matching of symbols to be used for AGC and TX/RX switching time, the (effective) coding rate may become higher. Also, a shorter S-TTI (for example, sub-slot S-TTI or S-TTI based on a smaller unit than the sub-slot) not only supports a higher coding rate but also further increases the coding rate if high-order modulation (for example, 64 QAM) is applied. Therefore, by taking into account the coding rate to be changed according to the S-TTI and the high modulation order, the present invention proposes a rule A related to methods for selecting an effective RB for TBS adjustment.

In the sidelink communication, a transmitting end, taking into account the reserved symbols, applies rate matching or puncturing to the packets to be transmitted and transmits the packets after rate matching or puncturing is completed. A receiver is able to use only those symbols (for example, 8 symbols) excluding the reserved ones among 14 symbols for decoding by using L-TTI (1 ms). At this time, the receiver assumes that the transmitting end has performed rate matching on the first symbol to be used for AGC and performs decoding or decoding after puncturing without the first symbol. At this time, part of the interval for AGC may be devoted to data reception under a specific condition according to the rule B to be described below. Also, the last symbol used for transmission/reception switching time at the transmitting end encodes data in order to transmit the data but does not actually transmit them. For this symbol, too, allocated resources may be utilized more efficiently by applying the rule B to be described below.

Figure 14:
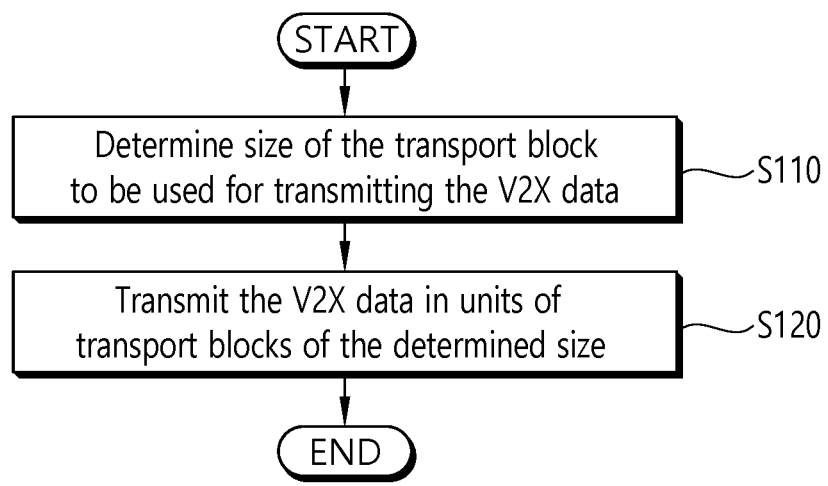
FIG. 14 illustrates one example of a method for transmitting V2X data.

FIG. 14 illustrates one example of a method for transmitting V2X data.

Referring to FIG. 14, a UE determines the size of a transport block to be used for transmitting V2X data S110 and transmits the V2X data in transport block units with the size determined above S120.

In what follows, a specific example for determining the size of a transport block to be used for transmitting the V2X data.

<Rule A>

In an uplink subframe, all of the REs except for those used to transmit a DM-RS (hereinafter, it is called DM-RS overhead) may be devoted to data transmission. However, for a sidelink subframe, the DM-RS overhead may be increased compared with the uplink subframe, and additional overhead due to AGC and transmission/reception switching time may have to be considered.

In other words, in the sidelink communication, the number of REs available for data transmission may be reduced significantly. In this respect, instead of selecting the TBS (first TBS) calculated from an existing resource block, the sidelink transmission may select a TBS (second TBS) lower (or higher) than the first TBS by using at least one of the method 1, 2, 3 below and transmit at least one of the PSSCH, PSCCH, and other sidelink channel.

More specifically, the current method for determining a TBS in the sidelink transmission selects an uplink TBS under the assumption that one subframe has two DM-RS symbols; on the other hand, the present invention may determine the TBS by using at least one of the following three methods due to the reasons described above.

<Method 1>

This method takes into account additional symbols in the 'number of allocated RBs' calculated for selecting a TBS in the LTE uplink or sidelink TTI and determines the TBS through an effective RB which has been reduced (or increased) by the ratio of the additional symbols. In other words, the effective RB may be determined on the basis of the amount of resources to which the V2X data may be mapped, excluding 'at least one of the DM-RS symbol, symbol for automatic gain control (AGC), and symbol for transmission/reception switching time'.

Figure 15:
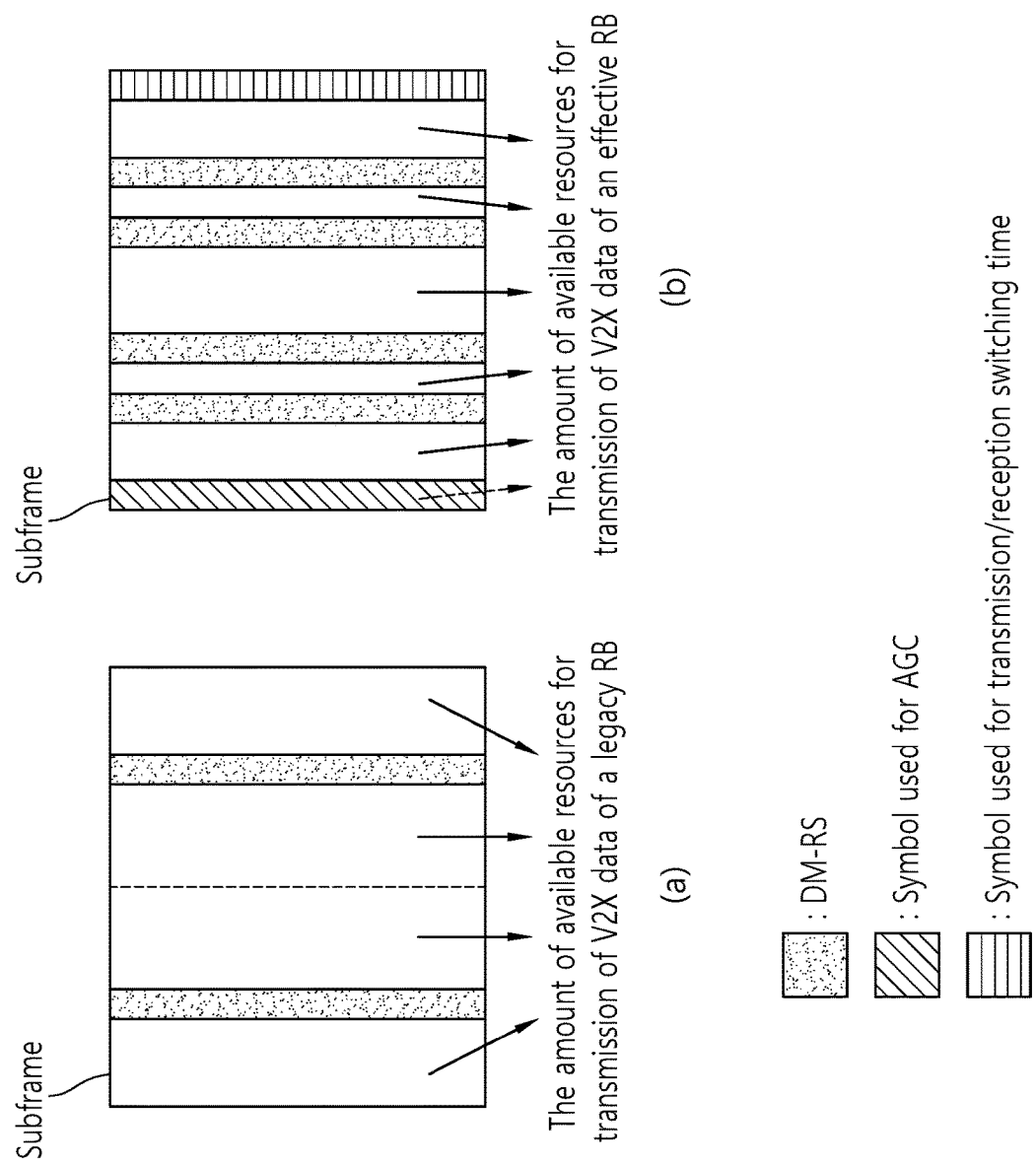
FIG. 15 illustrates compares the amount of available resources for transmission of V2X data in a legacy RB and an effective RB.

FIG. 15 illustrates compares the amount of available resources for transmission of V2X data in a legacy RB and an effective RB. At this time, the legacy RB may refer to an RB based on the assumption that one subframe has two DM-RS symbols.

Referring to FIG. 15(a), the amount of available resources for transmission of V2X data in the legacy RB may be determined by using the resource elements of the remaining symbols except for two symbols to which a DM-RS is transmitted in a subframe. On the other hand, referring to FIG. 15(b), the amount of available resources for transmission of V2X data in an effective RB may be determined by using the resources of the remaining symbols except for four symbols to which a DM-RS is transmitted, a symbol for AGC, and a symbol for transmission/reception switching time in a subframe. The amount of available resources for transmission of V2X data for the effective RB is reduced compared with the legacy RB.

Although FIG. 15 compares the amount of available resources for transmission of V2X data with respect to one subframe, comparison may be performed with respect to one resource block unit. When the TB size is determined through the effective RB, the present invention may take into account the ratio by which the amount of available resources is reduced due to presence of four DM-RS symbols in a subframe (namely the increased number of DM-RSs is taken into account). Similarly, the TB size may be determined through the effective RB which has been reduced (or increased) by the ratio determined by taking into account 5 symbols (namely, an additional DM-RS (=four DM-RS symbols) and '1 AGC symbol or 1 symbol for transmission/reception switching time' are taken into account). Or the TB size may be determined through the effective RB which has been reduced (or increased) by the ratio determined by taking into account 6 symbols (namely an additional DM-RS (=four DM-RS symbols), 1 AGC symbol, and 1 symbol for transmission/reception switching time are taken into account). To generalize the description above, the TB size may be determined through the effective RB which has been reduced (or increased) by the ratio determined by taking into account N symbols (where N is a value smaller than the total number of symbols in 1 TTI but larger than 0). As one example, when 6 or more symbols mentioned above operate as overhead, the TB size may be determined through the effective RB which takes into account the 6 or more symbols. For example, if 7 symbols are overhead, the effective RB which takes into account the 7 symbols (or more or less than 7 symbols) may be calculated.

<Method 2>

Method 2 takes into account additional symbols and reduces or increases the TBS obtained from TBS selection in the LTE uplink or conventional sidelink TTI by the ratio of the additional symbols in order to determine a new TBS. For example, when a first TBS is calculated from a conventional method, the first TBS is reduced by the ratio of the additional symbols in order to determine a new TBS (a second TBS).

For example, the TB size may be determined by reducing (or increasing) the selected TBS by the ratio due to 4 symbols (namely by taking into account an additional DM-RS). Or the TB size may be determined by reducing (or increasing) the selected TBS by the ratio due to 5 symbols (namely by taking into account an additional DM-RS and 1 AGC or 1 transmission/reception switching time). Or the TB size may be determined by reducing (or increasing) the selected TBS by the ratio due to 6 symbols (namely by taking into account an additional DM-RS, 1 AGC, and 1 transmission/reception switching time). To generalize the description above, the TB size may be determined by reducing (or increasing) the selected TBS by the ratio due to N symbols (where N is a value smaller than the total number of symbols of 1 TTI and larger than 0) (namely by taking into account an additional DM-RS, 1 AGC, and 1 transmission/reception switching time). As one example, when 6 or more symbols mentioned above operate as overhead, a TB size which takes into account the 6 or more symbols may be determined directly.

<Method 3>

Method 3 defines a specific coefficient value and changes the 'number of allocated RBs' calculated for selecting a TBS in the LTE uplink or sidelink transmission to the number of RBs reduced (or increased) as much as the defined coefficient value, after which determines the TB size.

The coefficient value may be different according to the MCS level. This is so because performance may be varied according to whether an effective RB is applied for each MCS value.

Meanwhile, the aforementioned TBS determination methods may be subject to the following rules. In other words, the aforementioned TBS determination methods may be applied only when at least one of the following rules is satisfied.

1. Rule 1: The case where an S-TTI (for example, a slot-based TTI or a TTI based on a smaller unit than slot) is applied (for example, the case where an S-TTI is applied to satisfy low latency requirement or the case where an S-TTI is applied to downlink/uplink/sidelink transmission).

2. Rule 2: A TTI shorter than a predetermined threshold value.

3. Rule 3: The case where the MCS level of a packet to be transmitted is higher than a specific MCS threshold value (for example, 64 QAM).

4. Rule 4: The case of the whole MCS level or specific MCS level.

5. Rule 5: The case where speed of a UE is faster than a predetermined threshold value.

6. Rule 6: A combination of all or part of the aforementioned rule 1, rule 2, rule 3, rule 4, and rule 5.

Whether to choose the rules 1 to 6 may be predetermined or indicated through an upper layer signal (for example, an RRC signal).

Also, through a predefined channel (for example, PSCCH (more specifically, reserved bits of the PSCCH)), a transmitting UE (or an eNB) may signal 1) whether to apply an S-TTI (or S-TTI length), 2) the aforementioned threshold value, 3) the number of effective RBs or coefficient value, and 4) ITBS value to a receiving UE with respect to the rules 1 to 6.

Meanwhile, suppose legacy UEs and advanced UEs (for example, LTE Rel-15 UEs) coexist. There may be a problem that transmission data of an advanced UE which has performed TBS adjustment may not be decoded by a legacy UE. To prevent the problem, a transmitting UE may signal at least one of the information about whether to use an effective RB (for example, whether to use an effective RB may be informed through 1-bit information in the on/off form), information about whether to allow the effective RB, and information for notifying that the transmitting UE is an advanced UE (for example, an LTE Rel-15 UE) to a receiving UE through a predefined channel (for example, a PSCCH (by using a reserved bit)). Similarly, at least one of the aforementioned information may be provided to the receiving UE through an upper layer signal (for example, an RRC signal).

Through a resource pool configuration, the network may inform of existence of an advanced UE which uses the aforementioned method.

The TBS adjustment proposed above is also applicable to such a subframe structure in which an uplink subframe and a downlink subframe are not defined separately, but an uplink/downlink region are all defined within one subframe (at this time, the subframe structure does not exclude the case where the entire symbols within the subframe are all related to uplink or downlink transmission).

As one example, suppose a different number of subframes are given, where the number of uplink symbols and the number of downlink symbols are different for each subframe. At this time, it may be possible to determine a TBS table which covers all of the possible cases, but this may cause excessive complexity and a lengthy standard specification.

To solve the problem, the method proposed above may be used, or TBS scaling which takes into account the number of symbols increased or reduced with respect to a subframe having a specific number of symbols (for downlink or uplink or both) may be used.

In addition, after the ITBS value is fixed, and the number of allocated resource blocks is scaled down, if a TBS value corresponding to the reduced number of resource blocks is used (for example, if a method similar to the method for adjusting a TBS in a special subframe is used) according to the operating principle defined in the current, existing standard specification, the number of RBs indicating the TBS which has become smaller than the size of a V2X message to be transmitted currently by a V2X transmitting UE may be prohibited from being selected.

In other words, the number of resource block, which has been scaled down, may be determined by "MAX {the minimum number of RBs providing a TBS value larger than or equal to the V2X message size, the number of RBs scaled down by a predetermined ratio}".

In addition, if the TTI length is increased compared with the L-TTI (which, for example, may be used for the purpose of expanding coverage) or if the TTI length is changed from the S-TTI to the L-TTI, a TBS scaling-up process is needed, which may be implemented in the opposite way the proposed method above is applied. In other words, if the TTI length is increased, the TBS may be increased according to the method 1, 2, and 3 for determining a TBS proposed above.

Also, as one example, a UE which performs a transmission operation according to a new format (for example, whether to use S-TTI in particular, 64 QAM, (new) TBS interpretation (/scaling), MCS adjustment, or a set of TBSs (or MCSs) different from conventional ones or whether to apply transmit diversity/carrier aggregation to V2X communication) to be introduced to advanced UEs (for example, UEs operating according to the LTE Rel-15) or according to the predefined rules above may determine whether to use the new format according to the rules described below (compared with legacy UEs (for example, UEs operating according to the LTE Rel-14)).

At this time, the network may directly determine the format to be used according to the following rules and set (or signal) the UE by using the determined format. In one example, if a message to be transmitted needs to be received by legacy UEs, a legacy format may be used. However, if the message is allowed to be received by advanced UEs only, it may be acceptable to use the new format.

Figure 16:
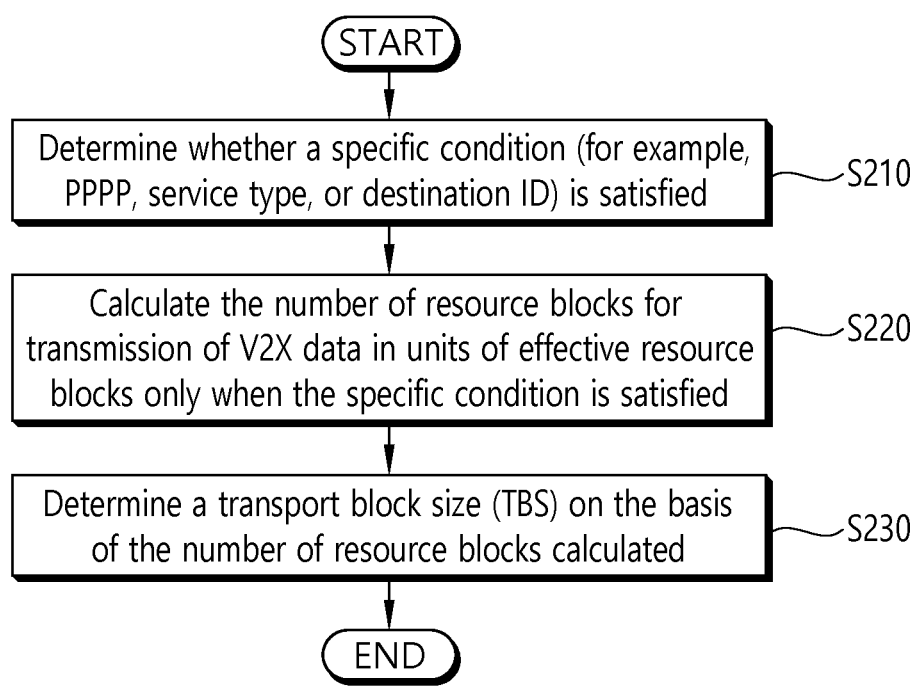
FIG. 16 illustrates one example of a method for determining a transport block size for V2X communication.

FIG. 16 illustrates one example of a method for determining a transport block size for V2X communication.

Referring to FIG. 16, a UE determines whether a specific condition is satisfied S210 and calculates the number of resource blocks for V2X data transmission in the effective resource block unit only if the specific condition is satisfied S220.

The UE may determine the transport block size (TBS) on the basis of the number of resource blocks calculated S230.

The specific condition may correspond to at least one of the conditions based on the value indicated by the following rule (for example, a PPPP value, service type (or service ID), or destination ID). The transmitting UE may determine whether to use the aforementioned new format according to the specific condition. Or a mapping relationship between the new format and the rule described below may be configured by the upper layer (for example, the MAC layer or application layer) to inform of whether the new format is allowed.

The specific condition may include at least one of the following rules.

Rule 1: A V2X message-related ProSe priority per packet (PPPP) value (or range) larger (or smaller) than a predetermined threshold value.

Rule 2: A service-specific PPPP value (or range) is larger (or smaller) than a predetermined threshold value.

Rule 3: A restriction on the service type of a packet (for example, a service applicable only to the LTE Rel-14, a service applicable only to the LTE Rel-15, or a service applicable to both of the LTE Rel-14 and 15). Here, a service type may indicate the ID of the service or more specifically a V2X service ID. The V2X service ID is an ID by which a V2X application program may be identified by the upper layer (for example, the MAC layer or application layer) and may be called an intelligent transportation system-application identifier (ITS-AID) (or provider service identifier (PSID)).

Rule 4: Quality of Service (QoS).

Rule 5: Attribute of a UE (for example, a vehicle type, speed of the UE, and synchronization reference time).

Rule 6: Road type (for example, road in the urban area or highway).

Rule 7: UE type (for example, a pedestrian UE, a UE installed on the roadside, or a UE mounted in the vehicle).

Rule 8: Miscellaneous service information.

Rule 9: A combination of all or part of the rules 1 to 8 above.

Here, the information about the rule is mapped to the PPPP and may or may not be delivered through the PPPP.

Also, a transmitting UE may receive, from the upper layer (for example, the MAC layer), information about whether to transmit a message by using a new format. Or the transmitting UE may determine whether to transmit a message by using a new format through the "destination ID" (ID of a receiving UE), "multicast ID", "packet ID", "version of the UE", or "release ID or release number" determined by the upper layer; or may identify a set of messages to be transmitted.

As one example, when the transmitting UE transmits a message by using the new format (for example, an S-TTI, 64 QAM, (new) TBS interpretation (/scaling), MCS adjustment, transmit diversity to V2X communication, or application of carrier aggregation), the transmitting UE may determine whether to transmit the message by applying the new format to the message through to the destination ID delivered from the upper layer.

At this time, the destination ID may be interpreted as an advanced UE for which the new format is allowed. As another example, in the case of multicast, a multicast ID may be used to enable message transmission by identifying transmission to a group comprising advanced UEs only.

At the time of V2X sidelink transmission or downlink or uplink broadcast transmission, the transmitting UE may transmit a message by dividing broadcast transmission levels according to the proposed methods above.

As one example, if the transmitting UE recognizes through the proposed methods above that the entire UEs are allowed to receive the message, the transmitting UE may broadcast the message to all of the UEs. Similarly, if the transmitting UE notices through the rule above that only the advanced UEs are allowed to receive the message, the transmitting UE may transmit the message at a different broadcast level. At this time, an indicator for indicating the broadcast level may be needed, which may be signaled to a receiving UE through a predefined channel (for example, a PSCCH).

The proposed methods above may cause a problem if the upper layer (for example, the MAC layer or application layer) combines different, small-sized messages into one packet.

As one example, if a legacy format message (for example, a V2X message according to the LTE Rel-14) and an advanced format message (for example, a V2X message according to the LTE Rel-15) are combined into one packet, a legacy UE (for example, a V2X UE according to the LTE Rel-14) is unable to decode the advanced format message, thereby failing to receive the combined message properly. Therefore, when the new format is used in such an example, two messages are not combined in the upper layer but are unconditionally split into different packets (or PDUs) to be transmitted.

Or even if two messages are combined into one packet, use of the new format is prohibited during actual transmission, and the messages are transmitted according to the legacy format so that legacy UEs may receive the messages.

For example, suppose an upper message A (or service) which allows 64 QAM, one of new formats, and an upper message B which does not allow the 64 QAM are combined into one packet with the same destination ID according to the conventional operation. In this case, when an actual MCS is determined, instead of using the 64 QAM, a legacy MCS (for example, QPSK, 16 QAM) may be selected so that legacy UEs may receive the packet.

<Rule B>

In what follows, a method for processing an AGC symbol and a symbol for transmission/reception switching time included in a TTI used for V2X communication will be descried in detail.

In general, if a coding rate is low (for example, less than ⅓), performance of a receiver is similar no matter which of puncturing and rate matching is selected; however, if the coding rate is high, performance based on rate matching may be better.

Currently, for the puncturing used in the LTE Rel-14 sidelink transmission, a transmitter may anyhow transmit data in the AGC interval, and a receiver may apply puncturing to the AGC interval and then apply decoding. Or the receiver may use only part of the first symbol for the purpose of AGC and may use the remaining signal of the first symbol together for decoding (which is a matter of UE implementation). Therefore, a partial area of the first symbol may be utilized for a transmission/reception purpose. And in the case of the last symbol, the transmitting end may encode data to transmit data but, in fact, may not transmit the data. Meanwhile, the receiving end may perform decoding by assuming that data have not been received at the last symbol.

However, if rate matching subject to the following rules is applied, reception performance of data transmission may be improved.

Rule 1: The case where TTI length is shorter than a specific threshold length.

Rule 2: The case where coding rate is higher than a specific threshold rate.

Rule 3: The case where an effective RB is applied or TBS adjustment is applied.

Rule 4: The entire MCS levels or a specific MCS level.

Rule 5: A combination of all or part of the aforementioned rule 1, rule 2, rule 3, and rule 4.

According to the rules above, 1) AGC and the last symbols may all operate by using puncturing as in the LTE Rel-14 sidelink transmission. Or 2) AGC and the last symbols may all operate by using rate matching. At this time, the AGC symbol may operate by using rate matching while the last symbol may operate by using puncturing as in the LTE Rel-14 sidelink transmission, or the AGC symbol may operate by using puncturing as in the LTE Rel-14 sidelink transmission while the last symbol may operate by using rate matching. Or transmission and reception may be specified to select either of the 1) and 2) scheme.

Figure 17:
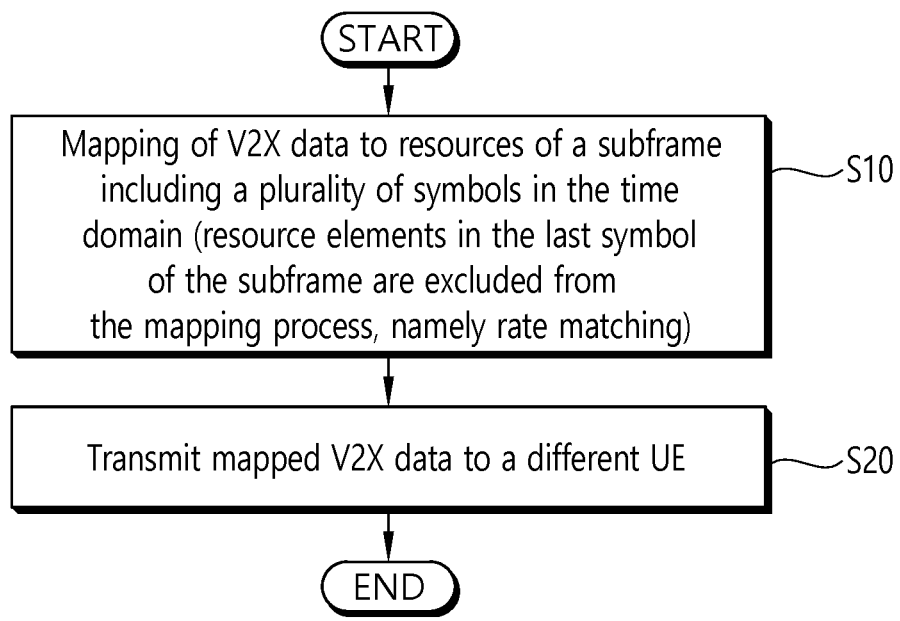
FIG. 17 illustrates a method for transmitting a signal by a UE for V2X communication according to one embodiment of the present invention.

FIG. 17 illustrates a method for transmitting a signal by a UE for V2X communication according to one embodiment of the present invention.

Referring to FIG. 17, a UE maps V2X data to the resource of a subframe including a plurality of symbols in the time domain S10. At this time, resource elements in the last symbol of the subframe may be excluded during the mapping process. In other words, the last symbol is used for transmission/reception switching time, and the resource elements included in the last symbol are excluded from the process for mapping to the resource elements of V2X data (modulation symbol). In contrast, if puncturing is applied to the last symbol, the resource elements of the last symbol are included during the process of mapping V2X data to the resource elements, but V2X data are not actually transmitted in the resource elements.

The UE transmits the mapped V2X data to other UE S20.

Figure 18:
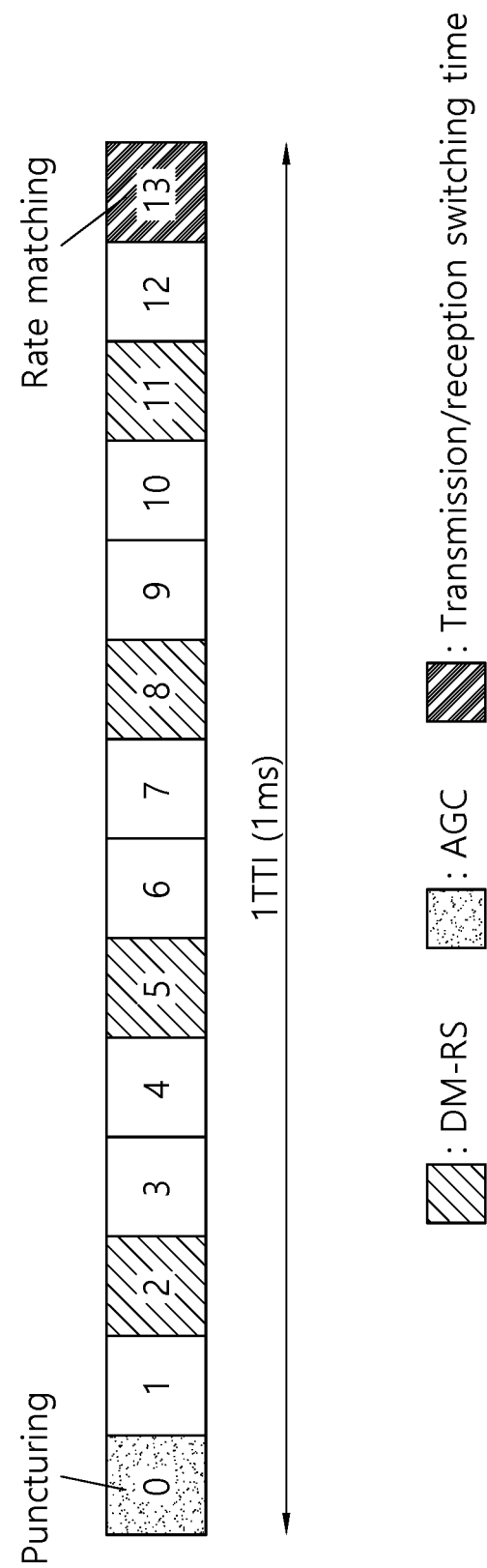
FIG. 18 illustrates an example of puncturing and rate matching applied to the first and the last symbol of a subframe used for V2X communication.

FIG. 18 illustrates an example of puncturing and rate matching applied to the first and the last symbol of a subframe used for V2X communication.

Referring to FIG. 18, puncturing may be applied to the first symbol of a subframe. More specifically, a transmitting UE may transmit V2X data after mapping the V2X data to the resource elements of the first symbol, and even if the V2X data are received at the resource elements of the first symbol, a receiving UE first applies puncturing to the received data after which decoding is applied to the punctured data. Or if the receiving UE is such a kind of UE which allows an AGC symbol shorter than one symbol, the signal received by part of the resource elements of the first symbol is used for the purpose of AGC while the signal received at the remaining resource elements may be used for data decoding.

And rate matching may be applied to the last symbol of the subframe. More specifically, the transmitting UE, after excluding the resource elements of the last symbol from the mapping process, may determine the transport block size. Also, the V2X signal may not be transmitted through the resource elements of the last symbol.

The puncturing and rate matching operations may be applied to both of a data channel (for example, PSSCH) and a control channel (for example, PSCCH).

Similarly, the aforementioned operation scheme may be applied only to the data channel while the control channel may employ the legacy operation (for example, puncturing) used in the current V2X communication. In particular, since this method is capable of maintaining the structure of the control channel independently of the transform between puncturing and rate matching in the data channel, an advantageous effect is achieved that a receiving end does not have to attempt to detect two types of control channels. The opposite case may also be possible.

Whether to select the rules 1 to 5 (namely whether to apply rate matching/puncturing) may be signaled through a predefined channel or indicated by upper layer signaling (for example, RRC signaling).

Also, the aforementioned threshold value (related to the rules 1 to 5) may be signaled to the UE through a predefined channel, or a transmitting UE (or an eNB) may signal the aforementioned threshold value to the receiving UE through the predefined channel (for example, (reserved bits of) the PSCCH). Or the aforementioned threshold value may be signaled to the UE directly through upper layer signaling (for example, RRC signaling).

In addition, data may be transmitted repeatedly (for example, data may be repeated after an AGC settling interval) to the empty resources generated due to application of rate matching or puncturing according to the aforementioned rules, or specific data (for example, a signal which supports fast AGC) may be transmitted thereto.

The transmitting UE which transmits a message according to the aforementioned rule A and/or B may signal the receiving UE to inform of whether to apply the corresponding rule, as described below.

First, TBS adjustment and/or a new format (for example, an S-TTI, 64 QAM, application (/scaling) of a new TBS, MCS adjustment, and new MCS table), which may be used by other advanced UEs, proposed by the rule A and the rate matching proposed by the rule B may be applied separately for a transmitting UE or applied together. In what follows, for the convenience of descriptions, the rule A is referred to as A, and the rule B is referred to as B for short.

1. When one of the A and the B is applied, the transmitting UE may signal the receiving UE through a predefined channel (for example, (reserved bits of) the PSCCH).

2. When both of the A and the B are applied, the transmitting UE may signal the receiving UE through a predefined channel (for example, (reserved bits of) the PSCCH). Here, the reserved bits may be used to inform the receiving UE of the A and the B separately by using two bits or to indicate simultaneous application of the A and the B by using one bit to reduce overhead of signaling. In particular, a signaling method using 1 bit maximizes communication performance when both the A and the B are applied simultaneously. In a situation where transmission is performed by an advanced UE capable of utilizing both of the A and the B, there is no other reason to insist on using only one of the two rules. Therefore, it may be preferable to reduce signaling overhead of a control signal by utilizing only 1 bit to make the A and the B always used simultaneously.

Meanwhile, the content of the present invention is not limited to direct communication between UEs but may also be applied to uplink or downlink communication where, in this case, an eNB or a relay node may use the proposed method. Since examples about the proposed method described above may also be included as implementation methods of the present invention, it should be clear that the examples may be regarded as a kind of proposed methods. Also, the proposed methods described above may be implemented separately but may also be implemented in the form of a combination (or merging) of part of the proposed methods. A rule may be defined so that an eNB may inform a UE or a transmitting UE may inform a receiving UE through a predefined signal (for example, a physical layer signal or an upper layer signal) about the information regarding whether to apply the proposed methods (or information regarding the rules of the proposed methods).

Figure 19:
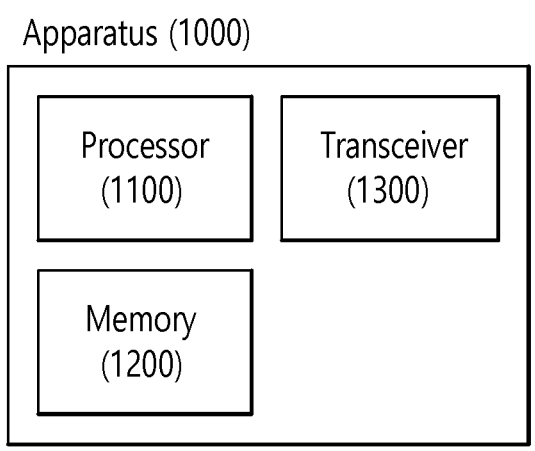
FIG. 19 is a block diagram of an apparatus in which an embodiment of the present invention is implemented.

FIG. 19 is a block diagram of an apparatus in which an embodiment of the present invention is implemented.

Referring to FIG. 19, the apparatus 1000 includes a processor 1100, a memory 1200, and a transceiver 1300. The processor 1100 implements proposed functions, processes, and/or methods. The apparatus 1000 may be a UE or an eNB. The transceiver 1300, being connected to the processor 1100, transmits and receives a radio signal. The memory 1200 may store information required to operate the processor 1100 and also store a transmission and reception signal.

Figure 20:
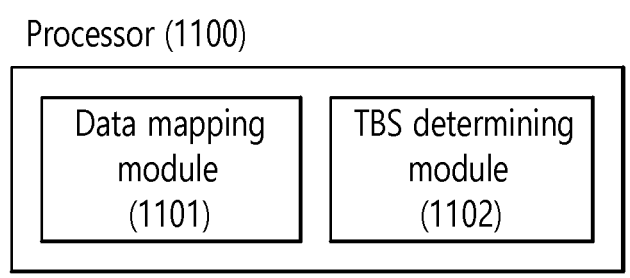
FIG. 20 illustrates one example of how the processor 1100 is configured.

FIG. 20 illustrates one example of how the processor 1100 is configured.

Referring to FIG. 20, the processor 1100 may further include a data mapping module 1101 which maps data to a resource, for example, a resource element and a TBS determining module 1102 which determines a TBS.

The processor may comprise an application-specific integrated circuit (ASIC), other chipset, logic circuitry and/or data processing device. The memory may include read-only memory (ROM), random access memory (RAM), flash memory, memory cards, storage media, and/or other storage devices. The RF unit may include a baseband circuit for processing the radio signal. When the embodiment is implemented in software, the above-described techniques may be implemented with modules (processes, functions, and so on) that perform the functions described above. The module may be stored in the memory and may be executed by the processor. The memory may be internal or external to the processor, and may be coupled to the processor by various well known means.

What is claimed is:

1. A method for receiving a signal in a wireless communication system, the method performed by a user equipment (UE) and comprising:
    receiving sidelink control information (SCI) from another UE through a physical sidelink control channel (PSCCH); and
    receiving data scheduled by the SCI from the another UE through a physical sidelink shared channel (PSSCH),
    wherein the SCI includes 1-bit information, and
    wherein the 1-bit information informs whether or not both a transport block size (TBS) scaling and a rate matching are included in a transmission format of the data.

2. The method of claim 1, wherein based on a value of the 1-bit information being 1, the transmission format of the data includes both the TBS scaling and the rate matching.

3. The method of claim 1, wherein the data is vehicle-to-everything (V2X) related data.

4. A user equipment (UE) comprising:
    a transceiver transmitting and receiving a radio signal; and
    a processor operating in conjunction with the transceiver, wherein the processor is configured to:
    receive sidelink control information (SCI) from another UE through a physical sidelink control channel (PSCCH) and
    receive data scheduled by the SCI from the another UE through a physical sidelink shared channel (PSSCH),
    wherein the SCI includes 1-bit information, and
    wherein the 1-bit information informs whether or not both a transport block size (TBS) scaling and a rate matching are included in a transmission format of the data.

5. The UE of claim 4, wherein based on a value of the 1-bit information being 1, the transmission format of the data includes both the TBS scaling and the rate matching.

6. The UE of claim 4, wherein the data is vehicle-to-everything (V2X) related data.

7. An apparatus, the apparatus comprising:
    a processor; and
    a memory coupled to the processor,
    wherein the processor is configured to:
    receive sidelink control information (SCI) from another user equipment (UE) through a physical sidelink control channel (PSCCH) and
    receive data scheduled by the SCI from the another UE through a physical sidelink shared channel (PSSCH),
    wherein the SCI includes 1-bit information, and
    wherein the 1-bit information informs whether or not both a transport block size (TBS) scaling and a rate matching are included in a transmission format of the data.

8. The apparatus of claim 7, wherein based on a value of the 1-bit information being 1, the transmission format of the data includes both the TBS scaling and the rate matching.

9. The apparatus of claim 7, wherein the data is vehicle-to-everything (V2X) related data.

* * * * *